(12) United States Patent
Seale et al.

(10) Patent No.: US 6,737,946 B2
(45) Date of Patent: May 18, 2004

(54) SOLENOID FOR EFFICIENT PULL-IN AND QUICK LANDING

(76) Inventors: Joseph B. Seale, 98 Day Rd., Gorham, ME (US) 04038; Gary E. Bergstrom, 191 Miles Rd., Moreland Hills, OH (US) 44022

( * ) Notice: Subject to any disclaimer, the term of this patent is extended or adjusted under 35 U.S.C. 154(b) by 30 days.

(21) Appl. No.: 09/789,682

(22) Filed: Feb. 21, 2001

(65) Prior Publication Data

US 2002/0008603 A1 Jan. 24, 2002

Related U.S. Application Data

(60) Provisional application No. 60/184,127, filed on Feb. 22, 2000.

(51) Int. Cl.[7] .................................................. H01F 7/08
(52) U.S. Cl. ........................ 335/279; 335/281; 335/220; 251/129.15
(58) Field of Search ................................. 335/279–281, 335/220; 251/129.15

(56) References Cited

U.S. PATENT DOCUMENTS

| | | | | |
|---|---|---|---|---|
| 5,269,269 A | * | 12/1993 | Kreuter ................. | 123/90.11 |
| 5,709,370 A | * | 1/1998 | Kah, Jr. ................. | 251/129.15 |
| 5,979,376 A | * | 11/1999 | Hatano et al. ........... | 123/90.11 |
| 6,125,803 A | * | 10/2000 | Hattori et al. ........... | 123/90.11 |
| 6,220,210 B1 | * | 4/2001 | Kobayashi et al. ......... | 335/261 |
| 6,308,667 B1 | * | 10/2001 | Tsai et al. ................. | 123/90.11 |
| 6,390,036 B1 | * | 5/2002 | Yuuki ....................... | 123/90.11 |
| 2001/0030307 A1 | * | 10/2001 | Bergstrom et al. ...... | 251/129.15 |

\* cited by examiner

Primary Examiner—Lincoln Donovan
Assistant Examiner—Bernard Rojas
(74) Attorney, Agent, or Firm—Pierce Atwood

(57) ABSTRACT

A solenoid with improved pull-in and landing characteristics. As a solenoid armature closes toward contact with the pole faces of a yoke, a geometric redistribution of a constant total flux causes the force to increase with decreasing gap. Latching force at saturation is maximized when the latching contact area matches the tightest bottleneck in the flux path. The addition of ferromagnetic area not making latching contact preserves the maximum latching force, increases power efficiency for pulling at a distance, and increases the flux redistribution effect of increasing force with decreasing gap at constant flux. The extra constant-flux force change at small gaps may be abrupt, for a high deceleration followed by a quick passive force increase to latch with low impact, or gradual, for tight servo control and very low impact. Conductive material can provide selective inductive damping near latching. Armature mass can be kept low despite the extra ferromagnetic area.

17 Claims, 10 Drawing Sheets

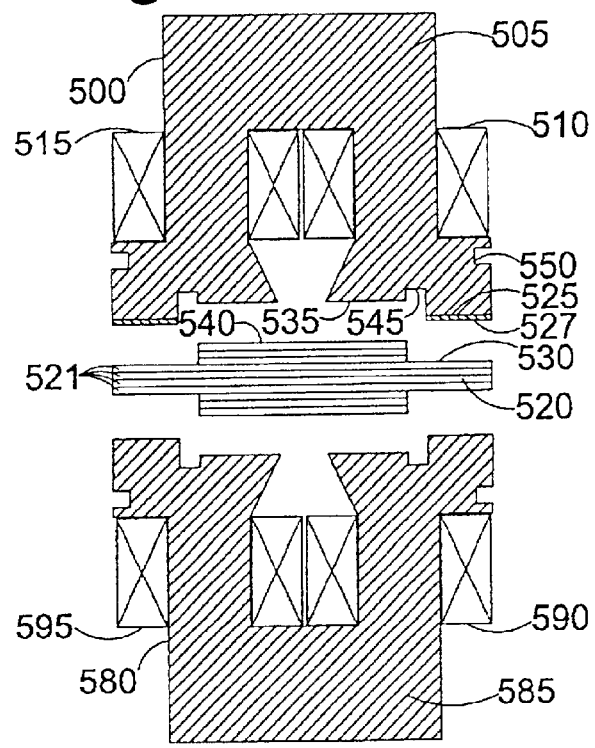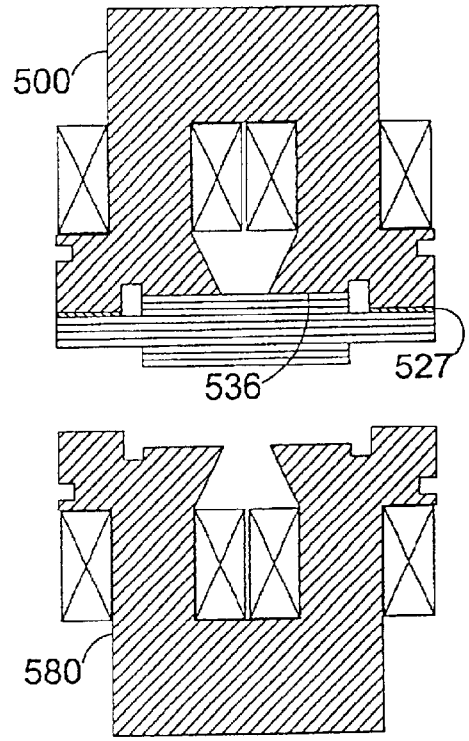

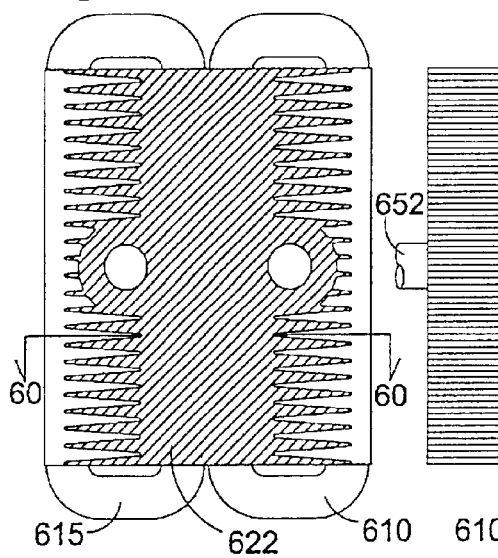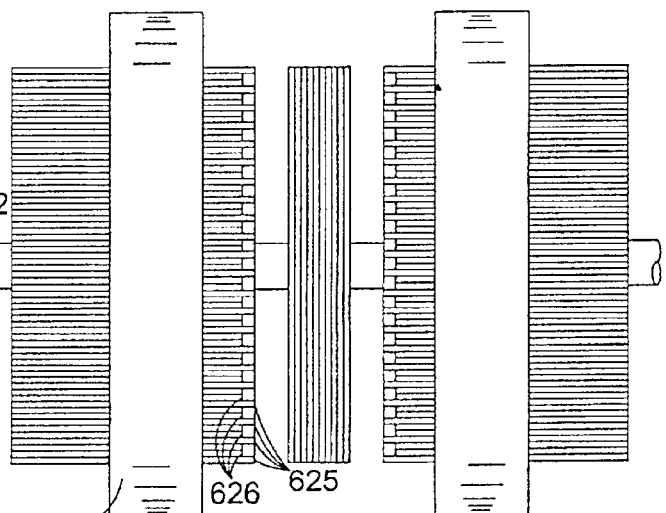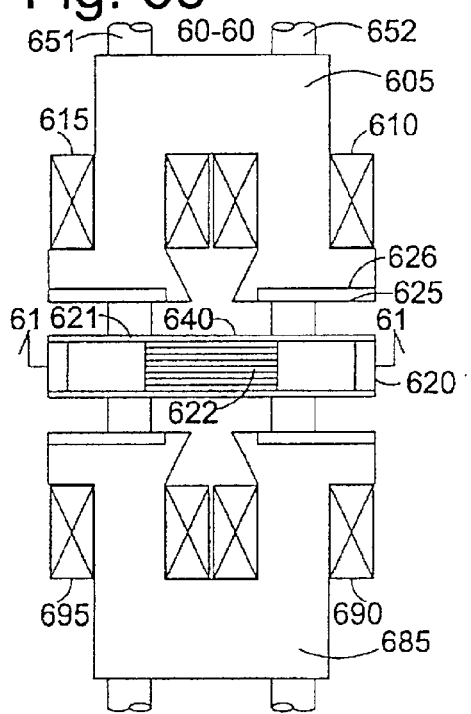

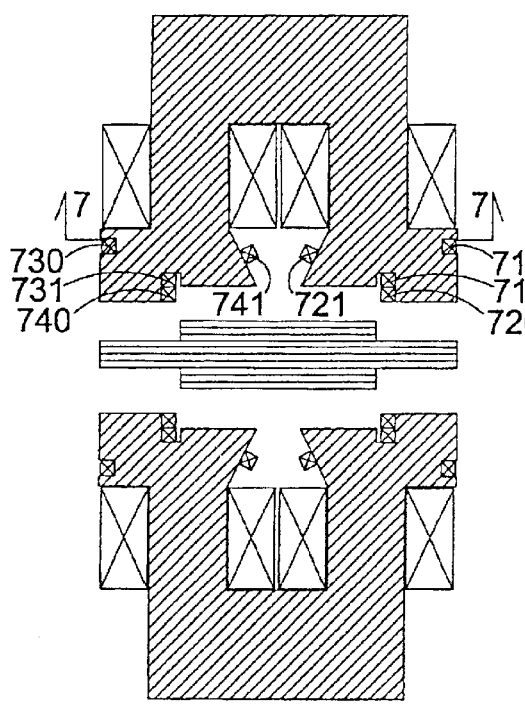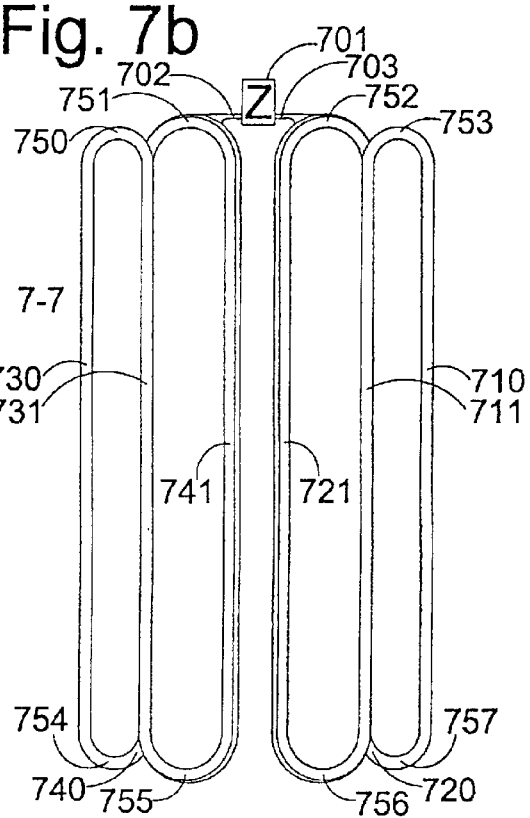
Fig. 7a
Fig. 7b

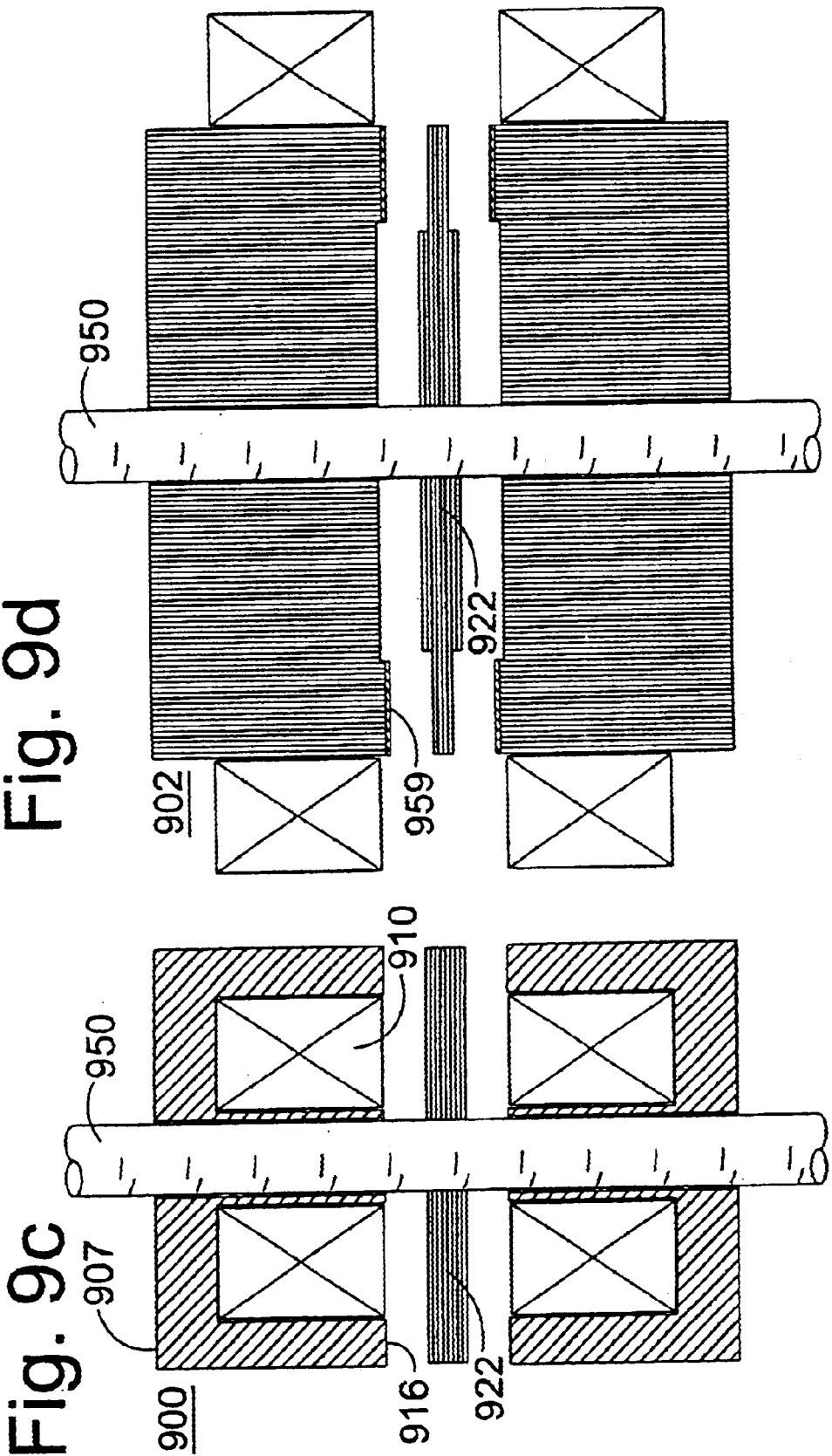

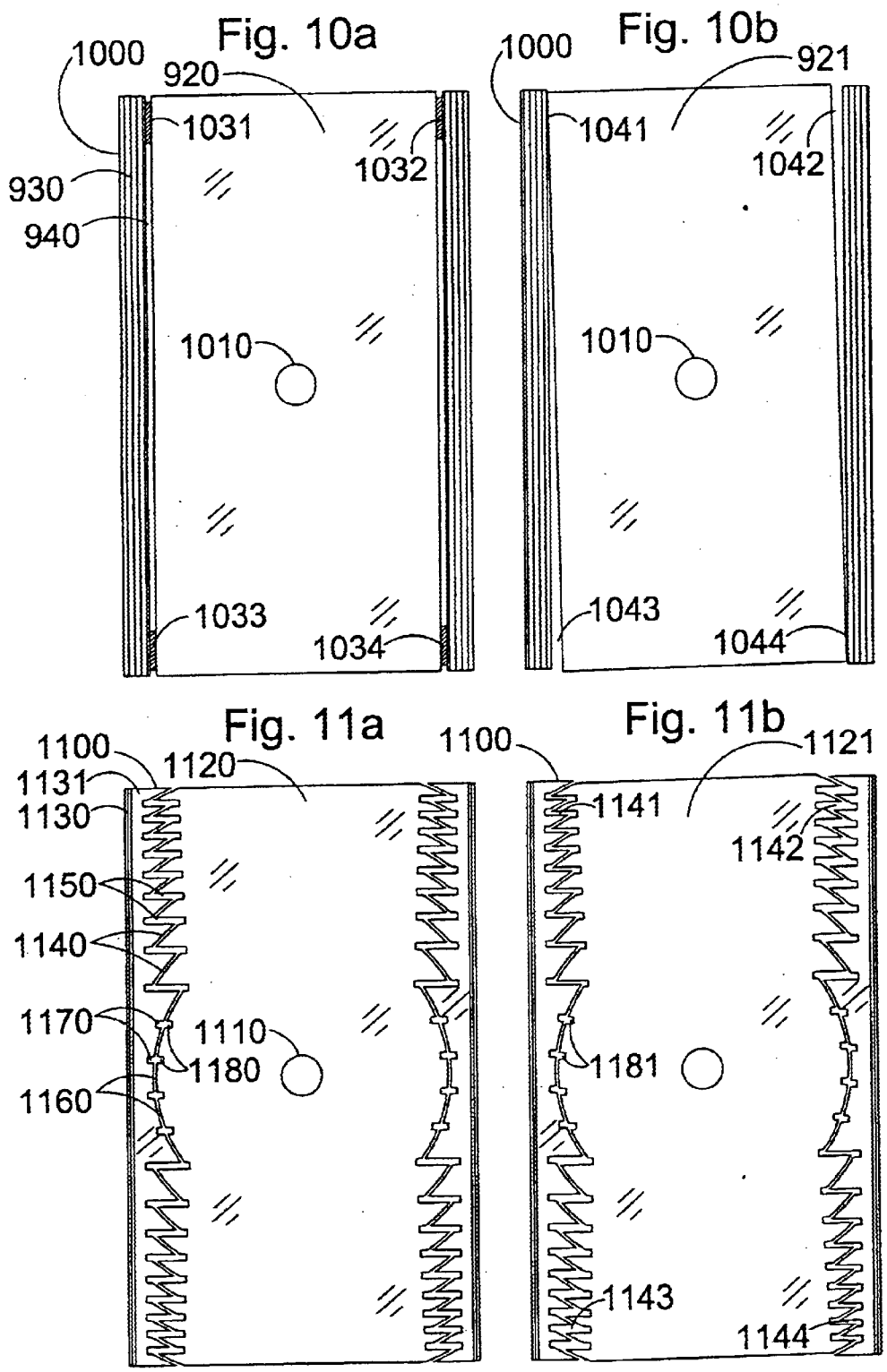

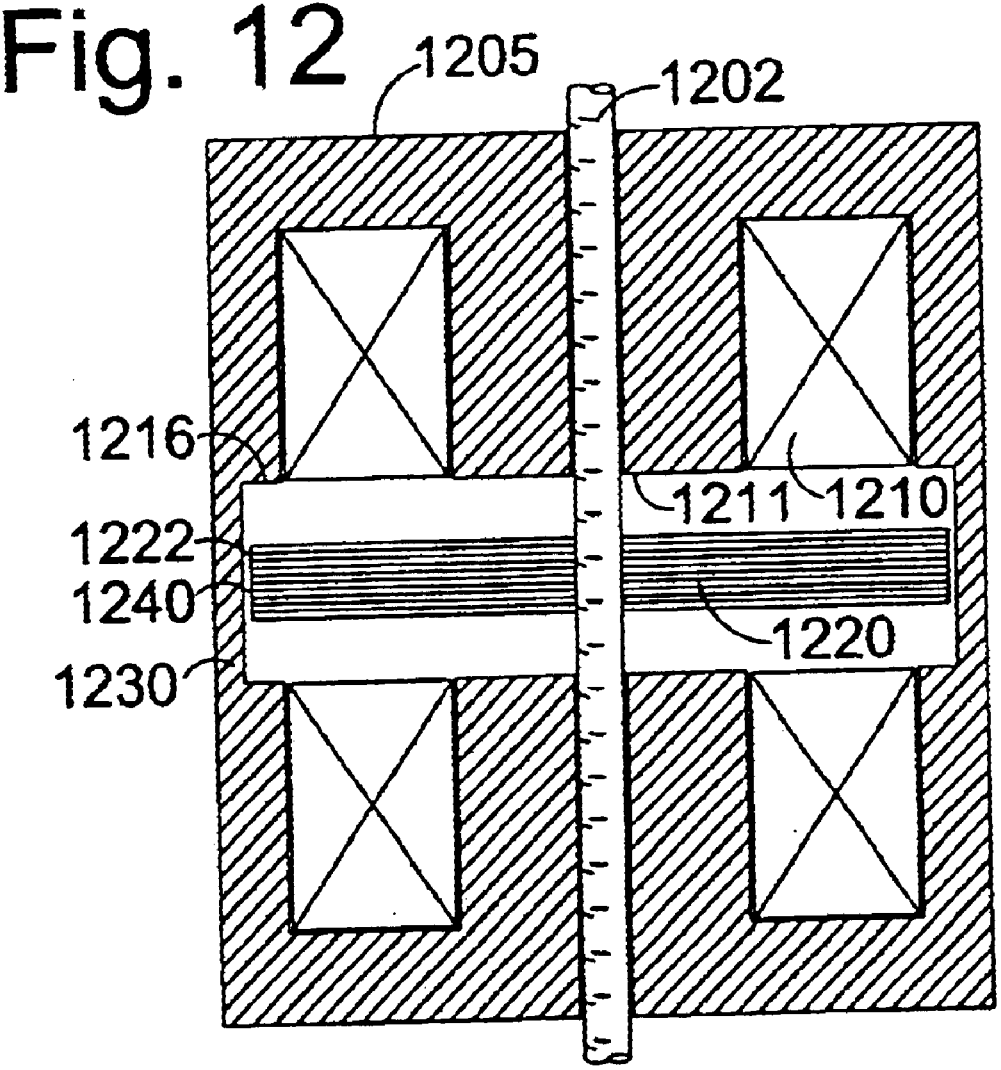

SOLENOID FOR EFFICIENT PULL-IN AND QUICK LANDING

CROSS REFERENCE TO RELATED APPLICATION

This application claims the priority benefit of U.S. provisional application serial No. 60/184,127, filed Feb. 22, 2000, entitled "A Solenoid For Efficient Pull-In and Quick Landing" by the same inventors. The content of the cross-referenced application is incorporated herein by reference.

FIELD OF THE INVENTION

The present invention relates to solenoids. More particularly, it relates to solenoids whose pole faces are shaped for controlled force characteristics. Most particularly, it relates to solenoids for direct actuation of automotive valves, achieving efficient pull-in from a distance, rapid deceleration on approach to closure, and a rapid increase to a latching force, with controllable electromechanical damping associated with latching and unlatching.

BACKGROUND OF THE INVENTION

The following discussion, and the invention to be described, relate particularly to solenoids that close magnetically with high speed, high magnetic force, and a large area of mating magnetic pole faces. Solenoids generating large magnetic forces are especially prone to close with an impact, generating noise and damage to the solenoid. The motions in solenoids and magnetic bearings have been successfully controlled by servo feedback control under limited conditions. For gradual motions and where the magnetic gap does not change by large fractional amounts, stable servo control has been demonstrated. When the magnetic gap changes from open to closed with mechanical poleface contact, and when the motion toward closure is very rapid, servo control is very difficult to achieve, especially for obtaining quick closure to a low-impact landing. This difficult control problem needs a solution if there are to be commercially viable automotive electric valve actuation systems, for example.

The invention to be disclosed in the following specification addresses the solenoid control problem not by way of a new servo controller, but by a fundamental redesign of the solenoid itself. The broad objective of the invention is to achieve electromagnetic characteristics that simplify the task of servo control. To understand the criteria behind this solenoid redesign, it is necessary to gain some understanding of the electrical servo control problem itself. The remainder of this background section examines the control problems that, in the prior art, have been addressed almost entirely from the controller side. This examination provides more detail than would normally be devoted to prior art, including issues that may not be widely understood. The intent of this close examination is to define the context of the current invention in sufficient detail that the design criteria will be understood.

A difficulty with servo control in a magnetic solenoid is that, in order for a controller to change electromagnetic force rapidly, the entire energy residing in the solenoid magnetic field must be altered in roughly the same proportion that the force is altered. To close a solenoid, electrical energy applied to windings is converted to magnetic field energy, which can be considered to reside mostly in the air gaps between the ferromagnetic armature and the magnetic yoke, which is part of the stator structure. For a given flux density, the magnetic energy in high-permeability core material is much lower than in air, in proportion to the relative permeability of the core material (typically in excess of 1000). If the total magnetic flux linking the yoke windings is held constant, then the magnetic field energy will diminish as the armature-to-yoke gap closes, eliminating the high-energy field passing through air. In geometries where armature motion is predominantly parallel to the magnetic flux crossing an air gap, the magnetic force of attraction between the armature and yoke is approximately the partial derivative of magnetic field energy with respect to armature position, evaluated under the constraint that total flux is held constant. As a flux-carrying solenoid gap closes, one can say that the field energy in the gap is transformed into mechanical energy. Conversely, when a narrow flux-carrying solenoid gap is mechanically forced to open, mechanical energy is transformed into magnetic field energy as flux-filled magnetic gap volume is created. In the idealized case of zero applied winding voltage and zero winding resistance, e.g., the case of a shorted superconductive solenoid winding with no source or sink of electrical energy, then pulling an armature away from a magnetized yoke will result in a growing armature-yoke gap filled with magnetic energy, that energy coming entirely from the mechanical work that pulls the armature. A difficulty with servo control of solenoid motion through control of magnetic force is that, in order to change force rapidly, a reservoir of magnetic energy must be filled or depleted rapidly. The magnitude of the energy in that reservoir is on the order of the total energy that would be delivered to the armature if the magnetic gap were closed completely, starting from the gap width for which the energy transfer problem is defined.

While the perspective of energy conversion sheds light on the bounds of possibility in a problem of this sort, viewing the problem in terms of momentum is sometimes more helpful for the control details. "Magnetic momentum" may be understood by direct analogy to mechanical momentum. The expression for mechanical kinetic energy, $\frac{1}{2} MV^2$ for mass M and velocity V, has its magnetic energy counterpart in $\frac{1}{2} LI^2$ for inductance L analogous to mass and current I analogous to velocity. Differentiating energy with respect to velocity or its analog, current, yields mechanical and magnetic momentum expressions: MV for mechanical momentum, and LI for magnetic momentum. Inductance L expresses the electrical "inertia" that resists change in current I, and when this inertia is overcome by the continued application of voltage, magnetic momentum LI is altered. A basic equation states that "$LI=n\Phi$," where "n" is the winding turns count and "$\Phi$" is the total magnetic flux linking the n windings. It is common to refer to the product "$n\Phi$" as the flux linkage. One sees that "flux linkage" is an alternative expression for "magnetic momentum"—the different terms emphasize different aspects of the same quantity. There is thus an "inertia" associated with magnetic flux, making flux difficult to change rapidly. The scaling of this magnetic inertia depends on the winding count, n. By extension of the mechanical analogy, a source of mechanical force and motion may transfer energy to a moving mass with a selectable mechanical advantage or disadvantage, established by a fulcrum or gear ratio. The mechanical advantage is selected for an impedance match between the characteristics of the energy source and the load. In a solenoid, by analogy to a mechanical gear ratio, the winding count n establishes the "electrical advantage" exerted by an electronic driver on the magnetic system. If n is low, the electronic driver has a high "advantage" analogous to "low gear" in a mechanical transmission, so that the driver can alter magnetic flux rapidly for a given voltage output. The problem associated with a low winding count is a high current draw, analogous to a motor having to rev at high speed when driving a load in low gear. Raising the winding count reduces the current draw for a given combination of magnetic flux and field gap, and it also reduces the ability of the driver to alter magnetic flux rapidly. As will be shown, an objective of the present invention is to cause needed changes in magnetic force, in order to direct the course of a solenoid armature toward soft landing, without demanding rapid changes in the total magnetic flux linkage, $n\Phi$. With a reduced tendency toward rapid "flux slewing," i.e. ramping flux up or down at a rate limited by power supply voltage, the electronic controller can gain better control of mechanical motion. Some of this control advantage can be traded off for a reduced peak current draw, by increasing the winding count, n. The improved electromagnetic design does not "solve" the control problem, but it makes it far more tractable, within engineering and economic constraints.

In order to control solenoid force and therefore cumulatively influence mechanical momentum, one must cumulatively vary magnetic momentum in order to change force. One sees that an extra "layer" of inertia and energy accumulation is inserted into the control path from actuation voltage to controlled position, resulting in a third-order control system. Consider a fast-moving solenoid with a high transfer of energy per stroke, as exemplified by either side of a double-acting automotive valve solenoid. FIG. 1 illustrates such a solenoid, typical of the prior art, in end elevation section. A powerful spring system, not shown, restores the ferromagnetic armature 120 to the midpoint between two latching yokes, 100 and 180. Top yoke 100 consists of an E-core 105 of ferromagnetic material, typically stacked laminations lying flat in the plane of the diagram, plus a winding 110 wrapped around the center post of the "U" and seen in section on the left and the right of the center post. Magnetic flux passing through air is concentrated predominantly across the gaps between the armature and the yoke posts, going in one direction (e.g., up) via the center post at 111 and going in the opposite direction (e.g., down) via the side posts 116 and 117 on the left and right. When 120 is pulled off center and latches against 100, gaps 111, 116, and 117 close, while pulling 120 in the opposite direction and latching against yoke 180 causes gaps 111, 116, and 117 to double in width compared to the FIG. 1 illustration. FIG. 2 illustrates a very similar solenoid in a U-core topology. Here, yoke 200 consists of stator 205 and a pair of windings, 210 and 215, wrapping around the right and left posts of the U-core. Windings 210 and 215 would typically be wound together, in series or in parallel, to connect to a single pair of terminals. Yoke 280, opposite armature 220 from yoke 200, is similar to yoke 200 and provides for latching 220 on the far side from 200, as with yoke 180 in relation to yoke 100. The U-core topology with armature 220 has two symmetric air gaps, 211 and 216, from the left and right posts of the U-core. In FIG. 3, the armature 220 has been pulled up and latched against U-core yoke 200, causing open air gaps 211 and 216 to become closed air gaps 311 and 316.

The following operational description for the armature and yoke assembly of FIGS. 2 and 3 is applicable with little change to the armature and yoke assembly of FIG. 1. More subtle differences in space utilization, latching force, and efficiency exerting a force on the armature across a substantial magnetic gap, will be discussed later. When the armature 220 is magnetically latched on either side, a typical mechanical energy stored in the spring (not shown here, but actually coupled between the armature and static structures holding the yoke) is 1.4 joules. Suppose that armature 220 is latched to top yoke 200, as shown in FIG. 3. Because the magnetic flux goes through closed gaps at 311 and 316, corresponding to the open gaps 211 and 216, without bridging through air, the magnetic energy is low, the inductance is high, and the electric current needed to maintain a latching flux is low—a property well recognized in the art, where power to maintain latching must be kept low. If the small voltage needed to maintain the latching field is removed, the field will decay relatively slowly, since the current-times-resistance product produces a small voltage to collapse the field. A reverse "braking" voltage will speed the reduction of field strength, with relatively low power transfer due to the low current. When the magnetic force falls below the applied mechanical forces, including spring force and other load forces (e.g., of gas pressure differentials acting on an automotive cylinder valve), then the armature starts to release, whereupon a growing magnetic gap will initially cause winding current flow to rise, typically even in the presence of an external braking voltage. The spring energy is going partly to impart kinetic energy to the armature and partly to build up magnetic field energy, a portion of which may be "harvested" from windings 210 and 215 using appropriate circuitry. If the magnetic flux is reduced slowly as the armature pulls away, magnetic attraction will persist and oppose much of the spring force that would otherwise be imparting kinetic energy to 220. Induced winding current will also climb quite high if flux is reduced slowly, as electrical energy is dissipated in winding resistance and, possibly, partially harvested by circuitry connected to the windings.

A strong braking voltage will reduce the field strength rapidly, giving a quick release and minimizing transfer of energy from mechanical to magnetic form. If the solenoid release allows an automotive exhaust valve to open against considerable residual cylinder pressure, a substantial fraction, as much as half or more of a typical 1.4 joule spring energy, is dissipated as the valve pushes upstream against outrushing exhaust gases. To get the armature to the opposite side and latched against spring force, the windings must be energized early, e.g., starting even before the armature is halfway across from one yoke to the other. To exert a high force and replace lost energy, e.g., 0.7 joules, in a period of a millisecond or so, the implied average power level works out to 0.7 joules divided by 0.001 seconds, or 700 watts. A higher peak power capability is typically needed. The number of windings chosen for 210 and 215 around core 205 of yoke 100, and similarly for windings in yoke assembly 280, needs to be set so that one to two kilowatts of power can be transferred at a reasonable combination of amperes and volts, e.g., 40 volts and 25 to 50 amps for 1000 to 2000 watts. The peak voltage will set the peak rate of change of the flux linkage $n\Phi$ or magnetic momentum, i.e. $d(n\Phi)/dt=$ 40 volts, approximately, neglecting electrical resistance. If power transfer is extended over one millisecond to transfer 0.7 joules in our example, then the net change in flux linkage $n\Phi$ must be the product $(d(n\Phi)/dt)\cdot(0.001\ seconds)=0.04$ volt-seconds. A volt-second is a unit of electrical impulse to change magnetic momentum, analogous to a newton-second of force impulse to change mechanical momentum. This volt-second figure to drive a given change in flux linkage remains about the same (discounting resistive voltages) whether flux is being built up for a large gap, to cause a solenoid to close after a substantial energy loss, or for a small gap, to cause a solenoid to latch promptly after a period of deceleration toward a stop. Suppose that peak wattage is to be constrained, to hold down the cost of electrical driver semiconductors. To replenish a given amount of lost valve energy, wattage is held down by using a relatively long time period to transfer a given amount of energy, e.g., one full millisecond for a total armature transit time of 3 to 3.5 milliseconds, as opposed to a much shorter period like 0.2 milliseconds. If the power transfer time is pushed much shorter, the designer encounters limits of magnetic saturation. If the power transfer time is pushed much longer, then yoke 280 would have to start pulling on armature 220 immediately upon the release of 220 from a latched state against yoke 200. Because of problems with flux leakage and spreading of the magnetic field and core saturation limits, it is not feasible to achieve a high force of magnetic attraction across such a large gap. The designer is typically constrained to make up energy losses in a time period somewhat, but not too much, under one-half the transit time of the armature from one yoke to the other.

Continuing with reference to a solenoid operated in conjunction with an automotive valve, as the armature approaches landing when engine RPMs are high, it is often desirable to have landing take place promptly, especially when a valve makes a quick transition from open to full-closed. (When a valve is approaching full-open, it is relatively unimportant how much time is required to get the armature through the last 10% of its travel to a fully latched position.) A transition path for an opening exhaust valve is illustrated by the graph of FIG. 4. 490 indicates the horizontal time axis, labeled "t", for a multi-trace graph of events associated with solenoid opening. The vertical scale on axis 400 is marked in increments from −1 to +1. The extreme values of −1 and +1 represent the range from −100% to +100% of full scale for three traces: −100% to +100% of center-to-peak travel for trace 420; and −100% to +100% of peak applied voltage for traces 425 and 430. Trace 410 represents exhaust pressure exerted against the valve. Trace 420 represents exhaust valve position, moving from fully closed on the top left to fully open on the bottom right. The first movement of trace 420 begins shortly before vertical wedge-shaped time marker 491. Observe that exhaust pressure trace 410 is falling before trace 420 indicates initial valve opening. In fact, trace 410 extends upward beyond the left side of the time range of FIG. 4 to a much higher peak pressure soon after ignition. The pressure falls as the piston descends, allowing the exhaust gas to expand. If the exhaust valve had not opened, the decline in exhaust pressure differential across the valve would have slowed to a stop at a positive pressure differential and then started to climb again, during the time range of FIG. 4, as the piston reached bottom dead center and started back up. In the events actually depicted in FIG. 4, the opening of the valve causes the rate of decrease in exhaust pressure to accelerate and then slow again as the cylinder pressure approaches equilibrium with exhaust manifold pressure, i.e. zero pressure differential exerting force on the valve. The exhaust pressure at time marker 491 is approximately 8 atmospheres in the illustrated simulation. Trace 425 shows a negative voltage pulse applied to the coil on the top holding yoke, e.g., yoke 200 of FIGS. 2 and 3, with the +1 armature position being the position of armature 220 in FIG. 3, latched to yoke 200 at a displacement of about 4 millimeters above its neutral center position. Trace 435 represents current in the coils associated with the top holding yoke, declining from a low holding value toward zero, the value reached at time marker 491 and where voltage trace 425 switches from its negative extreme to zero. The valve does not begin a rapid opening acceleration until current trace 435 is quite low, both because little current is required to maintain an established magnetic flux for the closed armature-yoke gap, and because the considerable exhaust pressure represented by trace 410 is neutralizing a substantial fraction of the mechanical spring force that would otherwise be pulling the solenoid and valve strongly to open. Voltage trace 425 continues at zero during a quiescent electrical period from time marker 491 to marker 492, at which point trace 425 is replaced by voltage trace 430, the voltage drive on the bottom yoke, e.g., yoke 280 of FIGS. 2 and 3, the yoke that pulls the armature to a magnetically closed bottom position with the valve fully open. Current trace 435 for the upper winding is replaced by trace 440 for the lower winding, with trace 440 starting up from zero at time marker 492. Observe that the application of voltage and the initial ramping up of current begins before the armature has traveled halfway from top to bottom position. Electromagnetic efficiency is very low up to time marker 493, where current trace 440 reaches its maximum, since the solenoid magnetic gap is large. Dashed trace 450, representing flux linkage in the lower yoke, approaches a level of significant core saturation on approach to time marker 493, and the resulting decrease in inductance causes current trace 440 to stop curving down and begin rising more sharply at it approaches a maximum value. A clamp in the controller recognizes a nominal saturation limit for signal trace 450 at +1 on axis 400 and switches to a mode of operation that clamps the flux, whereby drive voltage 430 is reduced to prevent 450 from exceeding the preset limit. When 450 becomes clamped, current trace 440 begins to fall, following the curve that maintains constant flux linkage as the magnetic gap closes and trace 420 comes closer to the full-closed level of −1 on vertical scale 400. At time marker 494, the flux linkage clamp logic releases as the motion control logic takes over and calls for a reduction in flux linkage trace 450. This flux reduction is driven by a negative voltage drive on trace 430 from time marker 494 to marker 495. The fall of current trace 440 becomes steeper in this time interval, driven down both by the decreasing magnetic gap and by the decreasing flux linkage. In the interval from time marker 494 to 495, magnetic pull-in force is being reduced to allow the armature to decelerate toward a landing at low velocity. At time marker 495, just before the first landing contact and slight bounce of the armature, the drive voltage kicks back up to the maximum limit, driving flux linkage trace 450 quickly up not quite to saturation, in order to provide enough magnetic force at closure to latch and hold the armature against full spring force. The magnetic gap closes fully, with a slight bounce, about midway between time markers 495 and 496, and at 496, the control system switches to a holding mode, reducing the drive voltage in order to stabilize flux linkage at a holding value. The corresponding holding current of current trace 440 is slightly higher than the initial value of trace 435, which was able to be reduced slightly because exhaust pressure was helping to hold the valve closed, whereas no corresponding pressure is helping to hold the valve open at the right end of trace 440.

Two related electromagnetic design issues are illustrated by the traces of FIG. 4. First, where a substantial fraction of the spring energy launching the armature of an exhaust valve is dissipated in overcoming an opposing flow of exhaust gas, the armature would fall far short of closure on the valve-open side unless a large power pulse were applied to the lower yoke when the magnetic gap was still quite large. The worst-case valve energy losses are overcome with worst-case low electromagnetic efficiency, resulting in high peak power requirements and high net energy drain, much of the energy being dissipated by electrical resistance. Magnetic pulling efficiency at large magnetic gaps is improved if the areas of attracting pole faces can be increased and if the narrowest pole face dimension can be increased. The efficiency loss issues for a given yoke winding are pole face area, spreading of the magnetic field between the pole faces and the armature with large gaps, and shunting of magnetic flux between poles of the yoke without reaching across to the armature. As will be discussed, U-core topologies have advantages over E-core topologies both in reducing flux shunting losses and in reducing the problem of spreading magnetic fields, since the two narrow end poles of an E-core are replaced by a single, wider end pole of a U-core. Thus, U-core topologies tend to do better at replenishing energy lost to exhaust gas flow. E-core topologies have an advantage of lower moving armature mass for a design with the same footprint and the same latching force. Further pole shaping issues will be discussed below.

The second related design issue concerns a quick transition from armature deceleration to magnetic latching. If the magnetic force attracting an armature builds smoothly to a maximum value at latching, the implication is that the magnetic force will approach a balance with opposing mechanical spring force, causing deceleration of the armature to slow as closure is approached along a smooth, gradual curve. For closing an automotive valve "crisply" without a lengthy and gradual approach, the magnetic pull-in force should ideally be quite low as the valve approaches closure, so that the spring force will be almost unopposed in decelerating the valve on approach to the valve seat. The problem is that if the armature and valve close while magnetic force is low and spring-driven deceleration is high, then the valve will start to re-open rapidly, before the magnetic flux can be built up to a sufficient level to latch the valve shut. Even though little current and little power are required for latching, the problem is a limited slew rate of magnetic flux linkage, a rate that is limited by the peak available coil drive voltage. Looking at it differently, one can say that the peak available coil drive voltage sets an upper limit on the controllable third derivative of valve position, which is the rate of change of acceleration. Smooth but prompt landing requires a large swing of the third derivative of motion. In this regard, the latching voltage pulse illustrated on trace 430 between time markers 495 and 496 is a difficult issue—one would like a much faster armature approach with a much lower flux, ending in a much bigger latching pulse. In the simulation for FIG. 4, magnetic flux trace 450 is maintained at or near its saturation limit for an extended period, providing pull to replenish valve and armature mechanical energy lost to exhaust gas forces, and thus keeping the valve moving toward full-open with solenoid closure, so that the motion does not fall short of latching. Since the electromagnetic pulling force is high even between time markers 494 and 495, the decelerating spring force is largely neutralized and the braking deceleration of trace 420 is low, giving a slow approach to closure. In a typical case where there is less energy loss to make up, particularly in an intake valve or any valve moving from open to closed position (i.e. the reverse direction of the valve-open stroke illustrated in FIG. 4), the magnetic flux could be quite low over the range of armature positions (trace 420) encountered between time markers 493 and 495. While this would give a faster approach with greater deceleration, the latching pulse on trace 430 initiated at time marker 495 would have to start much earlier, in order to pull flux linkage trace 450 up to the needed latching level starting from a much lower level during mid-trajectory. Thus, the quickness gained from less gas flow energy loss and a higher kinetic energy of the valve and armature crossing the middle range of motion, is mostly sacrificed during a more extended latching pulse as the latching transition marked by 495 is moved earlier in time.

To illustrate the magnitude of the quickness problem just described, a sinusoidal motion at the natural period of the spring and effective moving mass of the valve, armature, and spring simulated in FIG. 4 would give a half-period transition in 3.3 milliseconds. The actual transition time from initial motion just before time marker 491 to the first small touch-down bounce at time marker 496 is roughly 6.3 milliseconds, or about 1.9 times longer than a "nominal" transition time computed from the spring and mass alone. This 1.9-times multiplier becomes somewhat smaller where there is less energy loss to make up, but the figure remains well above 1.5 for most practical actuator designs.

The winding impedance matching problem previewed above is now seen in context. Drive voltage and current are both quite high on approach to time marker 493, as energy losses are replenished under low efficiency conditions. Given a limited power supply voltage, e.g., 42 volts DC, and given the expense of transistor circuitry to handle more than 40 or 50 amperes efficiently at such a low voltage, the designer is constrained to design a yoke winding with enough turns to give a resistive impedance of at least a few tenths of one ohm. For very rapid flux slewing with a small magnetic gap, where solenoid inductance is high and is the current-limiting factor in the short term, one would like a winding with very few turns, winding resistance not being an issue. When "very few" is quantified, the outcome is that one wants fewer turns for quick latching than one wants for high pull-in power. When the turns count is constrained to achieve high net magnetic pull-in power, valve closure that is both prompt and low impact becomes difficult or impossible to achieve. Too few volts and too many winding turns implies a cap on the third derivative of armature motion on approach to closure, and soft landing is achieved only by a slow and "lazy" motion. Quicker landing is achieved only with impact. If the bounce resulting from impact is not sufficiently damped, the armature will bounce so far open that magnetic forces cannot prevent the solenoid from failing to latch.

Various electronic schemes can permit high peak voltages at low currents to achieve quicker latching, but at a cost. The product of peak volts times peak amps from an amplifier entails a cost, even if the peak instantaneous wattage is substantially less than the product of a peak voltage occurring at a different time than the peak amperage. By conventional means, therefore, it can be difficult to design a valve solenoid that makes up substantial energy losses, especially in an exhaust valve, and simultaneously achieves very prompt latching.

OBJECTS OF THE INVENTION

An object of the invention is improvement of passive electromagnetic characteristics in closing and magnetically latching solenoids, contributing to overall efficiency, stability, and control in several areas: for pulling magnetically across a large gap to maintain kinetic energy and pull an armature to a closed latching position against a powerful spring; for electronically controlled soft landing; for a rapid increase of latching force created passively as a function of the mechanical closure of armature with yoke; for a rapid decrease of latching force created passively as a function of the mechanical opening of armature with yoke; and for reduction of bounce following closure of armature with yoke. A related object is to improve the efficiency with which a solenoid pulls across a large gap by enlarging the ferromagnetic attraction area between armature and yoke. A further related object is to provide one or more recesses in the attraction area, so that on closing or opening transitions, the magnetic flux through the solenoid abruptly shifts away from or toward the recesses and toward or away from a reduced poleface area achieving final mating contact, resulting in an abrupt passive increase or decrease in magnetic force on approach to or withdrawal from closed contact. As a means of achieving the above-described objects of enlarging the attraction area at a distance and causing flux to shift to a reduced mating poleface area for final mating contact, while at the same time minimizing the inertial mass of the moving armature, it is an optional object to recess some poleface area to prevent mating and to concentrate the reduced mating poleface area toward the middle gap or gaps, respectively, between the two legs of a U-core yoke or the three legs of an E-core yoke, and to reduce the armature thickness outside this reduced mating area, where less magnetic flux capacity is required. As an alternative means for enlarging attraction area at a distance and causing flux shift to a reduced mating poleface area, it is an optional object to create a multiplicity of narrow or small recesses distributed across the poleface area. Finally to achieve passive electromagnetic damping of magnetic closure or opening with flux shift as described above, it is an object to provide intentional eddy current conduction paths, responsive to the flux shift upon solenoid closure or opening by generating induced electric currents and dissipating the energy of those currents resistively. Optionally, a related object is to create the intentional eddy current conduction paths in the topology of one or more figure-8 windings, whose induced current response is low for a change in drive winding flux linkage at a large armature-yoke gap, but whose induced current response for a fixed drive winding flux linkage is high when flux paths shift laterally upon mechanical closure or opening of the armature-yoke gap. A further optional object related to passive electromagnetic damping is to control the presence or phase response or direction of that damping by insertion of an electrical impedance element or controllable impedance element, such as a capacitor or diode or transistor, in the eddy current conduction path.

BRIEF SUMMARY OF THE INVENTION

In the prior art, magnetic force F is commonly modeled in terms of the square of magnetic flux $\Phi$ that links the solenoid windings, multiplied by a variable function f of position X, according to Eq. 1:

$$F=-\Phi^2 \cdot f(X) \qquad 1]$$

The negative sign indicates a force of attraction, toward decreasing X, while X is commonly defined so that X=0 corresponds to mating of magnetic pole faces. In many treatments, the function f(X) is approximated as a constant coefficient, which is a fair approximation for some solenoids with long armatures, but which is a poor approximation for E-core, U-core, and pot core topologies with short armatures, as commonly applied to internal combustion intake and exhaust valve actuators, for example. Where the variability of f(X) is considered in the prior art, it is taken as a given, not easily altered within the geometric constraints of a problem. In control design, therefore, the focus has been on electrically altering flux $\Phi$ adaptively during the travel of the armature, to control motion, correct for gas-flow-related gains or losses of energy in transit, and achieve soft landing and latching. An engineering problem associated with this focus is the difficulty of varying flux $\Phi$ rapidly for soft landing and latching while maintaining efficiency for transferring substantial amounts of energy to or from the armature, to compensate for gas flow effects.

The present invention describes a method and device design, in multiple embodiment variations, for altering poleface geometry in order to tailor the attraction function f(X) to meet control needs, especially for combinations of improved electromechanical efficiency of energy transfer and of creating variations in f(X), on approach to landing and latching, that permit quick landing and latching within slewing and saturation limits associated with $\Phi$. The invention utilizes an expanded poleface area for efficient magnetic attraction to achieve energy transfer at a distance, combined with an abrupt increase in f(X) as gap X approaches zero. This abrupt increase in f(X) causes a large third derivative of armature motion which, on landing, gives a rapid transition from deceleration to a stronger attractive force for latching. On armature release, the same abrupt change in f(X) causes a rapid release from a latching condition with transition to high acceleration.

The physical mechanism behind the abrupt increase in f(X) as X approaches zero is understood in relation to Eq. 2, which expresses the normal force $F_n$ attracting a pair of flat parallel surfaces of ideal ferromagnetic conductor, mating over a net area A and conducting net flux $\Phi$ across a very small gap over the mating area (i.e., expressing force in the limit as gap X→0):

$$F_n=-\Phi^2/(2\mu_o A) \qquad 2]$$

Note that force F in Eq. 1 is a net axial force exerted on an armature, whereas the normal force $F_n$ may be for a fraction of an armature poleface area whose normal vector is not parallel to the axis of armature motion. Also, Eq. 2 is accurate only in the limit as the gap between the parallel surfaces approaches zero. It will nevertheless be recognized from Eqs. 1 and 2 that the force scaling function f(X) will be increased if the effective flux-carrying poleface area A can be caused to decrease with decreasing axial gap X.

Eqs. 1 and 2 are instructive where magnetic flux is restricted in some way, either by saturation or by slew rate. A different way of writing these expressions focuses attention on power consumption, a useful perspective when flux is not a limitation. Eq. 3 is closely related to Eq. 1:

$$F=-I^2 \cdot g(X) \qquad 3]$$

Since resistive power dissipation is given by Pwr=$I^2 \cdot R$ for resistance R, Eq. 3 indicates power efficiency in producing a magnetic force. Power dissipation is inversely related to g(X) for a given force F. Eq. 2 indicated that the flux-factor f(X) is inversely related to area. Eq. 4 indicates that the current-factor g(X) is proportionally related to area:

$$F_n=-I^2 n^2 \mu_o A/(2X^2) \qquad 4]$$

Like Eq. 2, Eq. 4 is accurate only for small values of gap X, but it indicates important trends. Solenoid power consumption varies with the square of the ampere-turn product, $I^2 n^2$, which is intimately related to power for a given winding window. While a change in wire size affects the number "n" of windings that will fit in a window, when one accounts for the resistance per turn of the wire that will fit the window, one finds that power varies fairly accurately with $I^2 n^2$, regardless of the wire gauge used. Thus, Eq. 4 indicates that an increase in effective magnetic attraction area A improves power efficiency, whereas Eq. 2 shows that a decrease in A increases force when flux Φ is the limiting factor. These properties are reflected in the functions f(X) and g(X) of Eqs. 1 and 3, such that f(X) and g(X) are oppositely related to magnetic attraction area. For obtaining a maximum latching force, the mating poleface area should be reduced to the minimum size that will conduct all the flux that can be carried by the remainder of the magnetic circuit. Magnetic saturation places a practical upper bound on Φ, while limitations on voltage applied to a solenoid drive winding set a practical slew rate limit on Φ. Thus, in the last few hundred microseconds before a solenoid closes, flux Φ cannot change significantly, so Eqs. 1 and 2, focusing on a fixed flux, best describe the force curve realizable in a very short time frame on landing and latching. When power consumption rather than flux is a constraining situation, Eqs. 3 and 4 focus best on the situation.

The multiple demands on a quick latching solenoid design are summarized as follows. First, the effective attraction area "A" should be kept as large as possible for large gaps X to provide efficient pull at distances where current limitations make it difficult or impossible to reach saturation limits. Second, the effective area A should be reduced abruptly as X approaches zero, in order to achieve a quick force increase at constant flux and switch from deceleration to latching. Third, the reduced mating poleface area at latching should be no larger than necessary to carry the flux of the remainder of the magnetic circuit at the threshold of saturation.

In solenoids with simple flat polefaces, as in FIGS. 1, 2, and 3, the magnetic field between widely spaced polefaces actually spreads out to cover an effective area larger than the poleface surfaces, and this effective area shrinks as the polefaces close and X approaches zero. Thus, f(X) in Eq. 1 is almost always an increasing function of decreasing X approaching zero. This increasing trend in f(X) as X approaches 0 is made even greater by the progressive reduction of stray flux linking the drive winding of a solenoid but shorting between parts of the yoke without bridging across to the armature. Modifying this typical trend, the behavior of f(X) can be substantially altered by designing for a lateral redistribution of magnetic flux across pole faces approaching mating closure, as portions of the pole faces are slightly recessed so that more prominent portions of the pole faces mate and draw flux away from the recessed or non-mating portions. Narrow grooves can be used in place of broader areas of shallow recess to redistribute flux away from the grooves as X approaches zero.

In the above description, flux shift of two sorts occurs. Solenoids lacking flux shift features, as illustrated in FIGS. 1, 2, and 3, have axial-facing or nearly axial-facing mating poleface area, and laterally-facing side area. The poleface area on the yoke includes regions of differing magnetic polarity, some area characterized by magnetic-north polarity and other area characterized by magnetic-south polarity, depending on the current rotation sense in the drive winding of the yoke. As a gap opens between mating axial-facing areas with armature motion away from the yoke, flux begins to flow through side areas of the yoke, with some of this flux leaking across from one side of the yoke to another, e.g. from a north-polarity to a south-polarity region, without entering and leaving the armature. This flux shift from facing area to side area reduces the axial armature force at a given net flux linkage from the yoke winding or windings. Solenoids including intentional flux shift features include, in addition to side area and axial-facing mating poleface area, additional axial-facing non-mating poleface area, which is recessed in some way. This non-mating area is typically shaped to add to the effective attraction area at a large gap from armature to yoke, resulting in more flux bridging from the yoke to the armature for a given magnetomotive force of winding ampere-turns. The force per ampere-turn is thus higher, but the flux is also comparatively high. At short ranges, where saturation commonly limits the total flux that can go to the armature, a concentration of the available flux into a smaller mating poleface area results in a higher latching force. The abruptness of the transition from efficient pull-in to high latching force at saturation can be controlled, making it abrupt for prompt landing, or making the transition more gentle if continuous servo control is sought down to very small armature-yoke gaps. A more gradual flux shift reduces destabilizing magnetic force gradients with respect to changing armature position, thus easing the demand on servo control. One might say that the recessed area is intentional by design, according to principles taught herein, and not an accidental design artifact, if less than 90% of the attracting poleface area is mating, with the remainder being axially facing but non-mating and recessed by more than an artifact of fabrication errors. For a solenoid characterized by "rapid" flux shift, a small axial gap opening, say 10% of the maximum axial armature travel, will produce a disproportionately large reduction in force at constant flux linkage through the drive winding, e.g., a force reduction of 20% or more. Without design for intentionally augmented flux shift, a 10% armature travel would typically produce a force reduction significantly less than 20%. These figures are not intended as limiting, but are given by way of example of magnitudes to be expected in common engineering designs.

Another way to achieve flux redistribution in an E-core topology is to provide lateral flux paths across gaps on the sides of the armature. The lateral flux does not generate much axial force, but the addition of low-reluctance lateral paths to side plates, bridging between the outside legs of the E-core and the sides of the armature, promotes greater total flux conduction for the same magnetomotive force. The effect is to increase the pull between the armature and the center post of the E-core for a given number of ampere turns, thus increasing the efficiency of pull at a distance. As the armature approaches axial closure with the E-core, the axially facing surfaces at the ends of the armature close with axially facing surfaces of the outer legs of the E-core, drawing flux away from the lateral gaps and creating an abrupt or gentle increase in axial force at constant flux linkage in the winding, depending on the geometric proportions. By combinations of lateral or oblique flux conduction paths, recessed poleface surfaces, and surfaces that mate, working with E-core, U-core, pot core, and other topologies, one can promote efficient pull-in across large gaps and control the increasing curve of force with decreasing poleface gap. This force control can include very steep increases in force with decreasing gap at small gaps, or more moderate rates of increase in force, depending on design tradeoffs between stable servo control and quick latching in time frames too short for effective servo control. By way of numerical example, but without limitation of the invention, when the armature in a typical design with ferromagnetic side plates is midway in its travel between the dual E-cores, a substantial fraction of flux entering the armature from the center pole of an electrically-energized E-core will travel laterally out of the armature and into the side plates, e.g., 50% or more into the side plates. (This is true only if one of the two E-cores is energized by a winding current. If both E-cores carried current, e.g. equal currents, then flux from one E-core center pole to the armature might pass through the armature and be drawn to the opposite E-core center pole, rather than flowing laterally to the side plates.) If the fractional flux into the side plates is much less than 50%, one might say that the side plates could be providing comparatively little advantage for efficient pull-in from a distance. When the armature travels to latch to the energized E-core, most of the flux that was traveling laterally into the side plates ought to shift to an axial path into axially facing surfaces of the outer posts of the E-core—e.g., with 80% or more of the flux shifted to the axial path. As with earlier figures, these figures are provided not by way of limitation, but by way of example of magnitudes associated with useful flux shift, for providing a significant improvement in the combination of maximum holding force at saturation, and efficiency at generating force across a large gap with reduced resistive power loss.

In either E-core or U-core or pot core solenoid topologies, the flux-carrying material in an armature must carry maximum flux across flux gaps, e.g. between the legs of an E-core or U-core, or in the radial gap of a pot core topology. Less flux is carried elsewhere, far from the flux gaps. The amount of flux-carrying material is varied across the width (or radius) of the armature to roughly the minimum, at each point, needed to avoid local saturation. This variation in flux-carrying material can be accomplished by stepping or tapering the portions of the armature that are away from flux gaps, or by creating cavities inside parts of the armature away from flux gaps. The armature mass is thus minimized. By further concentrating recessed areas away from flux gaps, the armature mass can be minimized in expanded, recessed areas. Thus, one achieves efficient attraction at moderate flux levels for large X, utilizing laterally extended and axially recessed poleface areas; one achieves an abrupt increase of force on approach to landing with a redistribution of flux inward to the thick, high-flux-capacity portions of the armature bridging gaps; and one maintains a moderately low armature mass.

Further modifications of the design provide intentional eddy current paths, associated geometrically with the areas of lateral flux redistribution for the abrupt increase in f(X), so that energy is dissipated during the flux redistribution, and damping is introduced into the force transition from deceleration to latching. Through modifications of f(X) and of damping associated with rapid changes in f(X) with changes in X, a designer applying the teachings of the current invention can create a target window, at a given small $X_o$, described in terms of the control space variables of velocity dX/dt and flux $\Phi$. If, upon reaching $X_o$ with a negative dX/dt (i.e. with the gap closing), the control space position (dX/dt, $\Phi$ lies within the target window, then without further application of coil drive voltage, the armature will land without excessive impact or bounce and will become latched. The idea is that for an $X_o$ so small and so close to the landing point that further active course correction is ineffective, the poleface design leading to f(X) and damping associated with dynamic changes in f(X) will cause the armature to achieve a successful landing and latching. The electromagnetic design of the solenoid substantially takes over the control process from the electronic servo controller in order to land the armature quickly. This quick landing is achieved successfully if the servo controller can hit a finite landing target window. The processes that occur on landing in such a design are so quick, and involve such large redistributions of magnetic flux, that they would be difficult to achieve through active electronic control in the absence of an improved passive electromagnetic design, as described in more detail below.

BRIEF DESCRIPTION OF THE DRAWINGS

FIG. 5a illustrates, in end section view, an improved variation on the solenoid of FIG. 2, utilizing expanded mating feet and recessed poleface areas to achieve a rapid increase in magnetic force for latching.

FIG. 5b is like 5a except that the armature is magnetically closed against the top yoke, so that the poleface recesses are more readily seen.

FIGS. 6a, 6b, and 6c show a U-core topology with expanded feet in three views: plan, elevation section from the side, and elevation section from an end. The transition from efficient pull at a distance to an abrupt force increase for latching is accomplished using teeth in the yoke poleface surface, created by an alternation of laminations, some extending down to the poleface surface and others recessed above that surface.

FIG. 7a illustrates the addition of shorted loops of wire to the yoke of FIGS. 5a and 6b to create electromagnetic damping forces as the pole faces approach closure.

FIG. 7b shows in plan view the figure-8 shorted loops seen in elevation section in FIG. 7a.

FIGS. 9c and 9d provide elevation section views from the end and side of another variation on E-core topology, here employing thinner armature regions extending into the depth dimension and using a slight recess for flux shift away from the thinner armature regions upon latching.

FIG. 10a illustrates in plan section view the armature of FIGS. 9a, 9b, and 9c, in relation to the bridges joining the upper and lower yoke sections in those figures.

FIG. 10b illustrates a rotation of the armature of FIG. 10a, showing how magnetic gap inequalities lead to destabilizing magnetic torsional forces.

FIG. 11a illustrates, in the same plan section view as FIGS. 10a and 10b, a modified shape to the left and right edges of the armature, with complementary changes to the bridge sections of the yoke, to provide higher lateral flux conduction with a reduction or elimination of destabilizing magnetic torsional forces.

FIG. 11b illustrates the same armature rotation compared to 11a as does FIG. 10b compared to 10a, in this case showing lesser fractional changes in magnetic clearances as compared to the earlier figures.

FIG. 12 illustrates, in side section, a solenoid analogous to that of FIG. 9a but with radial symmetry, a "pot core" geometry with flux shift from lateral flux to axial flux near the perimeter of the armature.

DETAILED DESCRIPTION OF PREFERRED EMBODIMENTS

Figure 3:
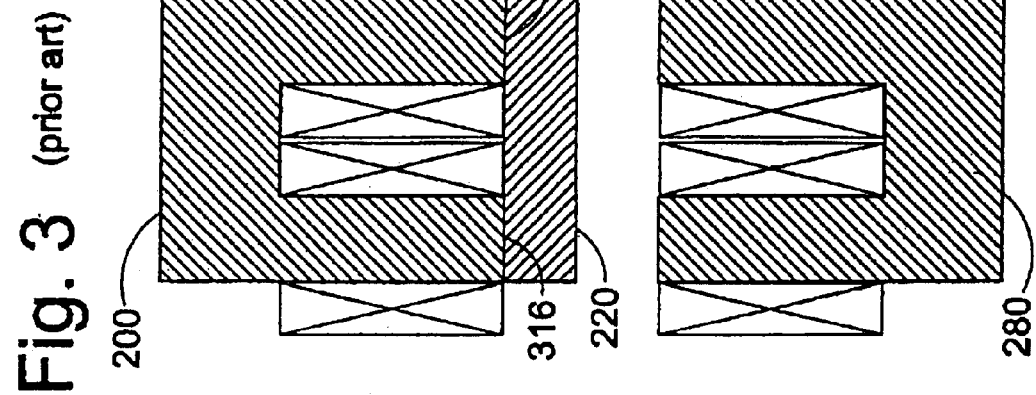
FIG. 3 illustrates the conventional solenoid of FIG. 2 except that the armature is magnetically closed against the top yoke.
Figure 2:
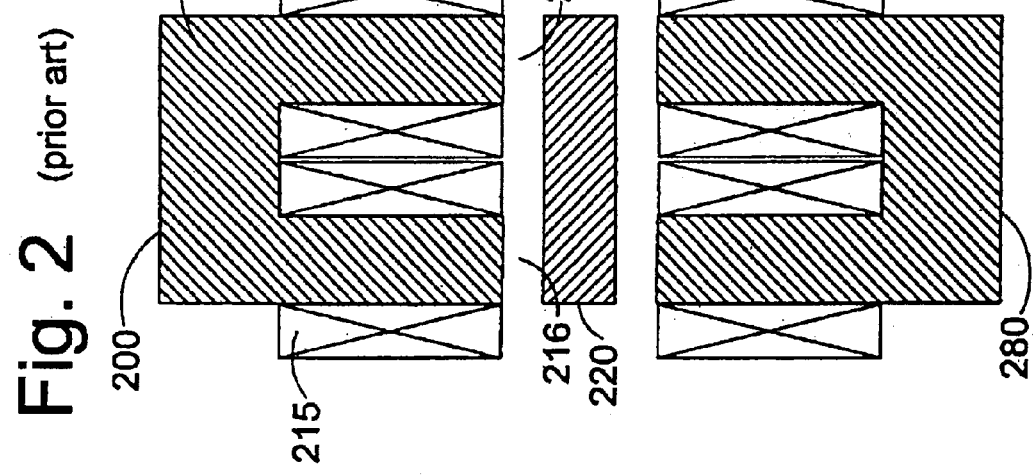
FIG. 2 illustrates an end section view of a double-acting U-core solenoid with centered armature at the prior art.
Figure 1:
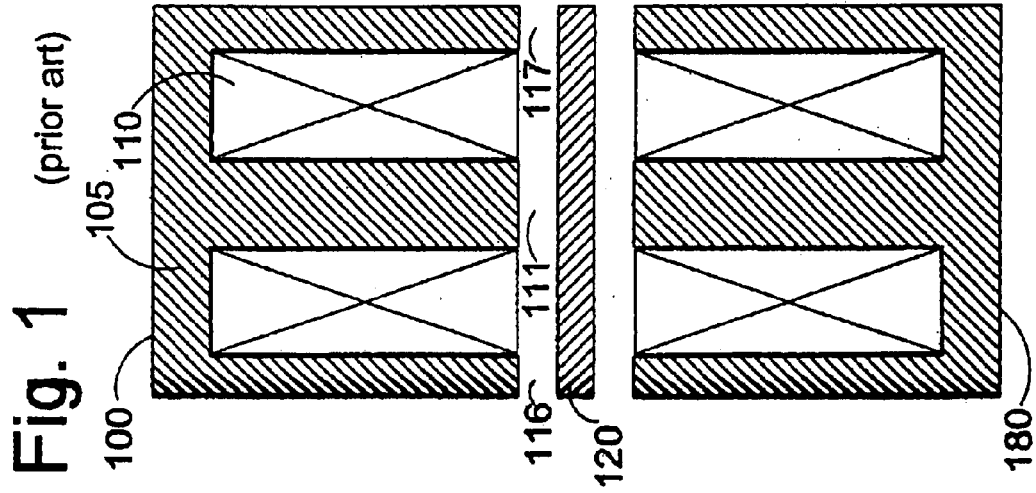
FIG. 1 illustrates an end section view of a conventional double-acting E-core solenoid of the prior art.
Figure 4:
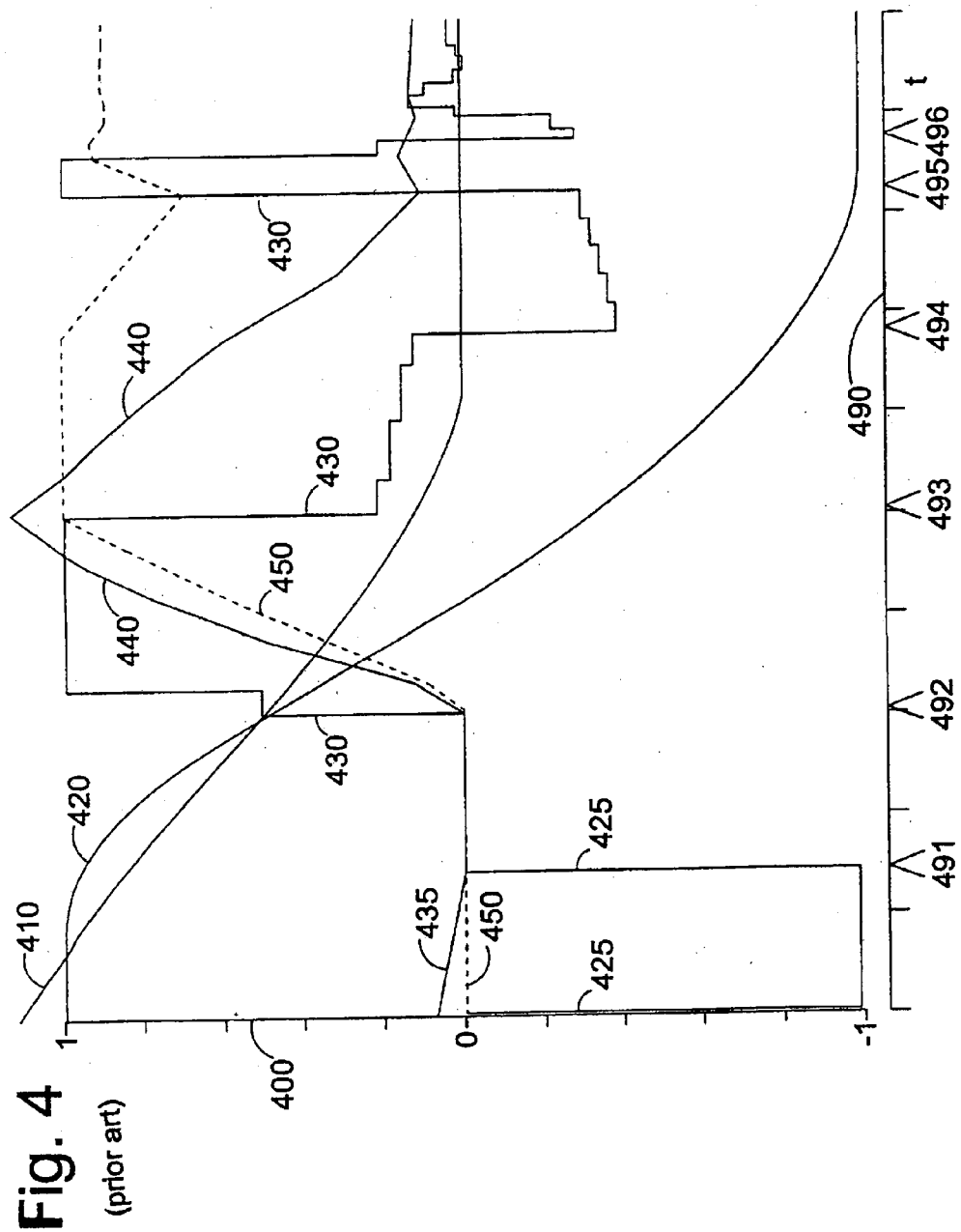
FIG. 4 shows multiple graphs on a common horizontal time axis, illustrating the dynamic variations of position, gas pressure differential, and various electric and magnetic parameters, as a conventional exhaust valve solenoid opens against a high cylinder pressure and is magnetically pulled to a soft landing.

A prior art approach to the design of double-acting automotive solenoids was discussed in relation to FIG. 1, while U-core variations on the same design were discussed in relation to FIGS. 2 and 3. The related problems of efficient pull at a distance and flux slew-rate limitations were discussed in relation to FIG. 4. Eqs. 1, 2, and 3 were introduced to explain how large effective magnetic attraction areas aid efficient pull at a distance, while reduced effective areas serve to increase or change or maximize force where flux or rate-of-change of flux is a limiting condition. With this background information, the improved functionality of the magnetic topologies illustrated in FIGS. 5a through 8c will be appreciated. These figures illustrate modifications on the U-core solenoid topology of FIGS. 2 and 3 to enlarge the poleface areas that pull at a distance, while using shallow recesses or narrow notches in parts of the poleface areas to cause magnetic flux to concentrate abruptly in a smaller area in the final small fraction of axial travel before landing at mechanical and magnetic closure. In relation to FIG. 5a, upper and lower stators 500 and 580, consisting of yokes 505 and 585 wound with pairs of coils, 510 and 515 above and 590 and 595 below, create a double-acting solenoid with respect to armature 520, between 500 and 580. Mechanical details such as a vertical shaft through 520, plus a spring system to restore 520 to a central position between 500 and 580, are not shown, since magnetic properties are of concern here. However, such could be added to the armature shaft 520 to create a useful device, such as an engine exhaust valve. The upper face of 520 is seen to consist of two horizontal levels, a surface 540 over the middle region of 520, a lower surface 530 to the left of center, and a comparable lower surface to the right of center. The bottom surface of 520 is similarly modified, producing a contour that is the mirror image of the upper contour. On the lower surface of yoke 505, surface 535 to the right of center mates with the right side of surface 540, while surface 525 to the outside right does not reach contact with the outer part of 530. The thickness that would be a gap between 525 and 530 upon latching of the armature is filled with a sheet 527 of non-ferromagnetic metal, an intentional site for eddy currents to cause damping of the latching motion. Recess notch 545 between plateaus 525 and 535 separates the two plateau areas 525 and 535 and avoids edge contact on closure, as does a mirror image notch laterally across on the left. As will be seen, 545 can be used to accommodate wire loops for damping purposes, as an alternative to the use of sheet 527.

Recess notch 550 similarly provides space for optional damping loops, as seen in FIGS. 7a and 7b, as does a mirror image notch laterally across on the left. The features described for the upper right quadrant of the drawing and repeated by mirror symmetry in the upper left quadrant appear also in the lower yoke 580, in the lower right and left quadrants. FIG. 5b illustrates closure of armature 520 with upper yoke 505. Yoke surface 535 closes with part of armature upper surface 540 at 536, while yoke surface 525 does not quite close with armature surface 530, leaving a magnetic gap filled with the non-magnetic sheet 527, and similarly on the left side. When the gap between 535 and 540 is comparable in thickness to 527, and when the gap between 525 and 530 is itself twice the thickness of 527, then the lateral distribution of magnetic flux is changing steeply as a function of poleface gap, concentrating to a smaller area on closure and spreading to a larger area on opening. At a given total flux, the force of attraction for almost touching flat polefaces varies inversely as the area over which the flux is distributed—this comes from the square-law relation between magnetic field strength and force per unit area. As discussed earlier, total flux linkage through coils 510 and 515 can change only at a limited rate, defined by the voltage capacity or voltage clamping characteristics of the circuitry driving these coils. The rate of lateral flux shift is not limited in this way and depends only on the shelf geometry and velocity of mechanical closure, unless there is significant conductivity for eddy currents, as may occur by intentional design. For the geometry of FIGS. 5a and 5b, the lateral flux shift gives roughly a 2-to-1 change in effective flux-carrying poleface area. As suggested by Eq. 2, this change in effective area at constant flux results in somewhat less than a 2-to-1 change in attractive force over the armature travel from full-closed at 536 to gapped at 536 by double the "shelf" gap of 527. For prompt landing of a solenoid, this abrupt change in attraction gives the large third derivative of motion needed for a quick transition from high deceleration on landing approach to zero second derivative of motion upon latching. For a prompt launch, the flux shift moving in reverse provides a rapid increase in acceleration at constant flux as the armature pulls away from the yoke.

The lamination layout in FIGS. 5a and 5b is designed to give bending strength in the thin dimension of the armature, provide relatively low eddy current losses with changes of flux across moderate to large magnetic gaps, and give higher eddy current losses with rapid lateral flux shift. The yoke laminations are stacked in conventional fashion, with their flat planes lying in the plane of the drawings (i.e. FIGS. 5a and 5b) and stacking in the dimension out of the drawing plane. Thus, when flux lines travel in the drawing plane at various depths, the induced eddy currents are driven to loop up and down through and across the planes of the laminations. Insulation between the laminations inhibits the large eddy current loops that would otherwise form, minimizing losses. The armature laminations, e.g. as indicated by the separate lines from the number 521, are stacked so that they are viewed edge-on, thin in the vertical drawing direction (i.e. the direction of axial armature motion), extended left-to-right in the plane of the drawings, and extended perpendicular to the drawing plane. This stacking inhibits large eddy current loops for change of horizontal flux, e.g. in the middle of the armature. When flux penetrates vertically (parallel to armature motion) from the yoke pole faces through the thicknesses of the laminations, then changes in this vertical flux induce eddy current loops in the lamination planes and, similarly, in the plane of sheet 527 and the sheet opposite 527 on the left. These eddy current loops allow significant but possibly acceptable energy losses in normal solenoid operation. Very abrupt changes in overall flux would drive up eddy current losses, but the high inductance of the overall flux circuit prevents such abrupt flux changes. On the other hand, a slight excess of closure velocity, leading to a slightly hard landing, results in a very abrupt shift of roughly half the flux away from 525 and the symmetric opposing armature surface, and toward 535 and the symmetric opposing armature surface. Eddy currents in the planes of the armature laminations and in 527 and its counterpart on the left delay this flux shift and thus delay the increase in force to the high latching level. The reduced net attractive force for a fast landing allows the armature to decelerate somewhat more before landing, so that the velocity of hard landing is diminished. One cannot assign a simple "L/R" time constant to flux shift with eddy current damping, because the effective inductance "L" associate with eddy currents varies with gap. If the varying "L/R" delay characteristic of eddy currents and flux shift is appropriately chosen, however, one obtains significant bi-directional damping, reducing force of attraction on landing approach and then increasing force of attraction on bounce after landing, in comparison to the force that would prevail in the absence of eddy currents. Compared to systems of the prior art, this sort of damping makes solenoid landing less sensitive to electronic controller errors, and it widens the error window for latching capture without having failure to close or failure to recover and latch after a hard closure bounce.

FIGS. 6a, 6b, and 6c illustrate an alternative way of accomplishing a rapid change of attractive fame with axial gap for constant flux and at small gaps, using a toothed yoke face. FIG. 6a shows in plan view the section 61—61 of FIG. 6c, providing a view of top yoke windings 610 and 615 and of lamination 622, which lies just below the center of thickness of armature 621 at the arrows in FIG. 6c labeled 61. Going in the other direction, the arrows labeled 60 in FIG. 6a indicate the location for the elevation section of FIG. 6c, as indicated there by the numbering 60—60. All the laminations in armature 620 feature the teeth of 622 except for top lamination 621 and the symmetric bottom lamination. Theme teeth are for armature mass reduction. Near the outermost edges on the left and right of 620, there is no large flux accumulation, so the single laminations handle the flux. As lateral flux accumulates moving from edges to center, the middle toothed laminations widen to handle the flux coming from either the top surface 640 or the opposite bottom surface of 620. The vertical conduction of the teeth connects top and bottom armature lamination sheets, allowing both sheets to contribute to flux conduction from either side. At the level of cross-section 60—60, in tooth notches, the sheet width is at the minimum shown in FIG. 6c. None of the central core of 620 is hollowed out. Note extra core material to conduct flux around the vertical holes for twin vertical shafts 651 and 652. Note that the bottom yoke 685 and winding pair 690 and 695 are lice their top side counterparts, 605, 610, and 615.

The mass reduction features just described do not relate to flux shift, which is now described. In this example, two out of every three laminations in a yoke stack include recess notches to recessed surfaces 626, while the third lamination in a group of three gives a lower surface at 625, which mates with armature 620, as seen in FIGS. 6b and 6c. These recess notches do not extend all the way to the middle of the yoke, but leave an inside area of contact without the gaps. While the proportions of FIGS. 6a, 6b, and 6c may be varied, these illustrations indicate how latching flux is concentrated toward the center of the armature and how the internal armature geometry minimizes mass to the extent possible without creating flux bottlenecks. For the large upper gap associated with the centrally located armature, the effective area of magnetic attraction is not strongly affected by the recess notches in some laminations. The flux distribution over most of the gap is little different for the presence of these notches, while some flux lines have to travel a slightly longer path to reach an inside surface of a notch, while a few other flux lines get squeezed to greater concentrations upon approach to prominent surfaces like 625. The squeezing together of some flux lines and the extra path length added to others results in a slight increase in reluctance compared to the value that would prevail without any recesses. Hence, as suggested by Eq. 3, power associated with the term $(nI)^2$ is associated with a large area coefficient and produces pull at a distance with good efficiency. Upon landing and latching, however, flux rapidly concentrates into a reduced mating area to produce both a quick force increase and a maximum achievable latching force, consistent with the limitations on total flux imposed by the flux-carrying cross-sections across the middle of the armature and through the middles of the yoke windings.

FIGS. 7a and 7b show how eddy current paths can be added for controllable electromechanical damping characteristics. Note that while most of the features of stator assembly 500 of FIG. 5a are preserved in FIGS. 7a and 7b, conductive plate 527 of the system of FIG. 5a and its counterpart on the left are omitted in favor of a more selective way of obtaining electromagnetic damping. In many contexts it is desirable to provide for eddy current damping of the landing and latching process of a solenoid, while minimizing eddy current damping associated with changes in net flux linkage through a drive coil like 510, 515, 590, or 595. This is accomplished using the figure-8 winding topology of FIGS. 7a and 7b. In relation to the elevation section view of FIG. 7a, the arrows numbered 7 indicate the viewing direction 7—7 of FIG. 7b, a plan view (not a cross section) showing only the damping windings, with all other components removed from 7b for simplicity. In FIG. 7a, the windings are seen in section at 730, 731, 740, and 741 on the left, and correspondingly at 710, 711, 720, and 721 on the right side of the upper yoke, with similar windings on the lower yoke. FIG. 7b shows the straight segments of windings through which these sections are taken, excepting hidden straight segments 740 and 720, which are hidden below segments 731 and 711 and are labeled with 740 and 720 at their bottom ends, emerging into curving portions 754 and 757. Following the numbers in a figure-8 sequence around the left winding in FIG. 7b, one has left outside straight segment 730 continuing into upper end arc 750, into upper middle straight segment 731, into lower end arc 755, into right inside straight segment 741, into upper end arc 751, into lower middle straight segment 740 (hidden below 731), into lower end arc 754, and completing the circuit back into 730. The corresponding loop on the right starts with 710 on the right outside straight segment, continuing through 753, 711, 756, 721, 752, 720, 757, and full circuit back to 710. One possible topology is to have each of these figure-8 circuits shorted and independent of each other. If a net change in flux through poleface surfaces 525 and 535 on the right of FIG. 5a, and through notch 545, is divided equally between what passes through the left and right hand loops of the figure-8, then the induced voltages in the two loops of the figure-8 cancel. The shorted loop generates little or no power dissipation of damping for net changes in flux linkage. If the "common mode" fluxes in the opposing loops of the figure-8 are unbalanced and a null is desired for dissipation at a specified armature position, then the figure-8 can be wound to include some closed unbalanced loops on one side or the other of the figure-8 double loop, so that the flux-times-turns product, or flux linkage, is balanced for a specified geometric distribution of flux. When a lateral flux shift takes place upon closure of mating poleface surfaces, the rates-of-change in flux act differentially between the opposite rotation senses of the two loops of the figure-8, causing reinforcing induced voltages and a large induced current. Thus, the dissipation and damping are high for lateral flux shift, but minimal for net flux changes across a poleface gap not nearly closed. The damping figure-8 loops on the left and right can be cross-coupled via wire pairs 702 and 703 going through block 701, labeled "Z" to indicate that an impedance can be inserted into the circuit here.

With both 702 and 703, note how one wire of the pair comes tangentially off the top of the circular end of the winding while the other includes a small circular arc touching down tangent to the same circular end. If the loops of wire illustrated here consist of many turns of fine wire, it is not necessary for each turn to make a figure-8. An equivalent performance can be obtained if a simple winding of many turns is connected in series with an adjacent simple winding of many turns, not necessarily an equal number, such that the current rotation senses (i.e. clockwise or counterclockwise) in the adjacent windings are opposite. Such an interconnection might be called a "figure-8 equivalent" winding topology, easier to manufacture than the literal figure-8 illustrated in FIGS. 7a and 7b.

Electronic circuitry can be inserted into 701 to vary the characteristics of the damping loop. For example, insertion of a diode into 701 can cause damping on approach to magnetic closure while preventing damping in the reverse direction, upon release from a latching state. This generally desirable modification has the potentially undesirable side effect of inhibiting damping of bounce following closure. Insertion of actively controlled circuitry in 701, e.g. a field effect transistor operating in parallel with a resistor, can permit programmable alteration of the damping characteristics of the winding. Hence, the damping loop can be turned on for soft landing and turned off for quick release. While the maximum amount of damping obtainable from the windings in a shorted state (i.e. with no added impedance from 701) depends only on the net cross section of conductor in the winding and the conducting material (e.g., copper), the subdivision of that cross-section into many windings of small wire or few windings of large wire can control the impedance range of the winding, thus permitting an impedance matching to practical components for use in 701. In many practical applications, it will be desirable to keep 701 simple, either doing nothing (a short) or serving a passive function as with a diode, to differentiate between landing and release responses.

Eddy current damping of flux shift can arise through simple eddy current loops in poleface materials, or through the addition of slabs of conductive material, e.g., by filling the poleface recess gaps in FIGS. 5a and 5b with a sheet of conductive material such as copper, like component 527. Unlike the figure-8 winding of FIGS. 7a and 7b, such simple solutions will not differentiate as completely between net "common mode" and lateral "flux shift" changes in flux. Furthermore, the attainable damping of flux shift becomes very low in a topology like that of FIGS. 6a, 6b, and 6c, where the areas for flux shift are subdivided into multiple narrow strips.

Figure 8A:
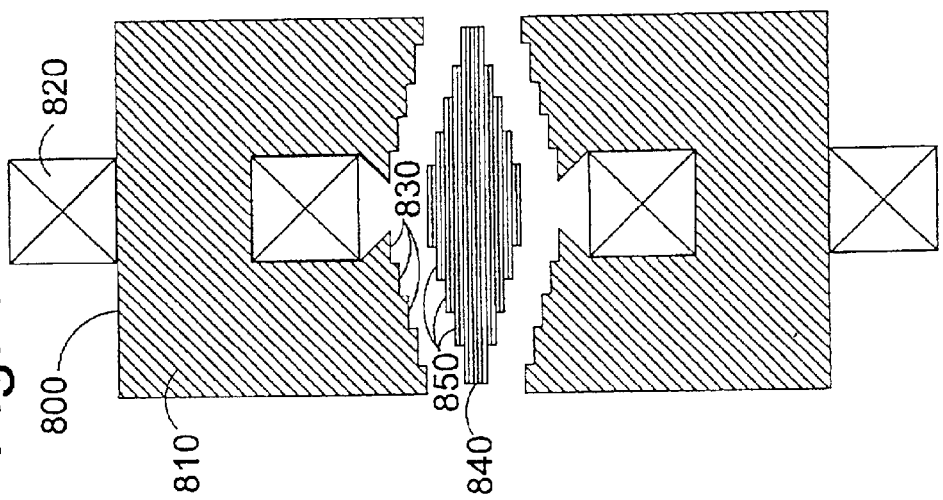
FIG. 8a illustrates a variation on the design of FIG. 5a and following, to achieve similar electromagnetic performance with reduced armature mass, using stair-step reductions in armature thickness at either end.
Figure 8B:
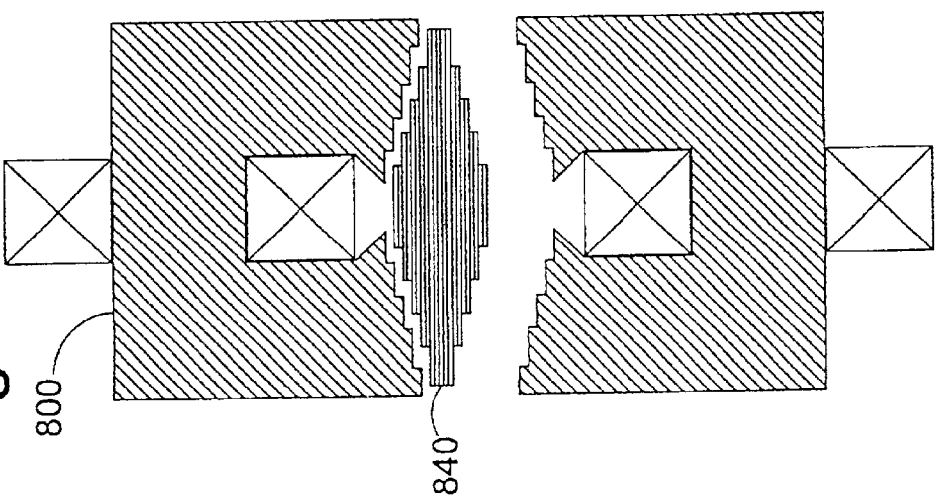
FIG. 8b is like FIG. 8a except that the armature is moved from a center position to near closure with the top yoke, to better illustrate the multiple stair-landing mating areas and the gaps separating these mating areas.
Figure 8C:
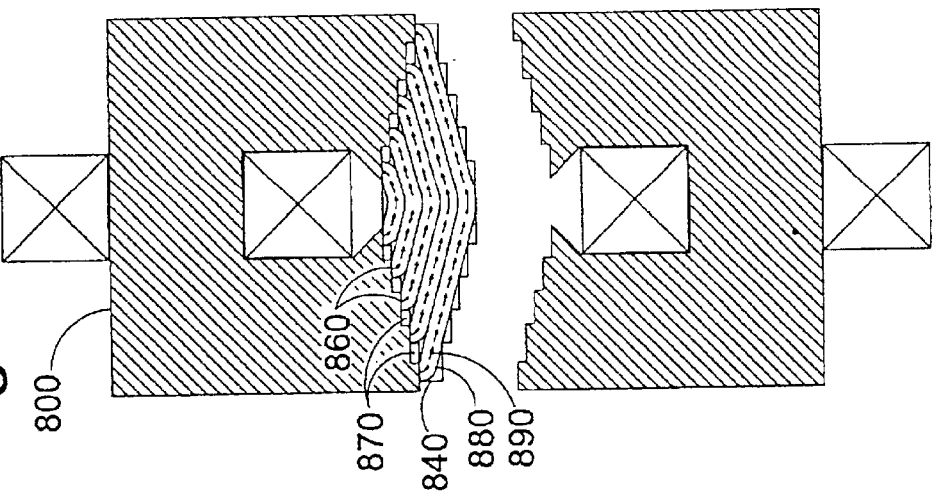
FIG. 8c extends the progression of FIGS. 8a and 8b, with the armature reaching full mechanical closure against the top yoke. Bands and arrow indicate the pathways for magnetic flux, which are free of significant bottlenecks and utilize most of the cross-section of the armature.

FIGS. 8a, 8b, and 8c illustrate a U-core configuration that gives flux shift in a mechanically robust armature of reduced moving mass for a given latching and flux shift performance. The flat planes of the armature laminations lie perpendicular to the axial direction of armature motion. Assembly 800 includes a top-half winding 820 wound up and over the back of the core 810, replacing the side-by-side windings 510 and 515. Keeping to the same total width of yoke plus winding, as in FIGS. 5a and 5b, the yoke of FIGS. 8a, 8b, and 8c achieves a larger flux-carrying cross-section in the legs coming down on either side of the lower lobe of winding 820—actually more than needed, since the flux "bottleneck" occurs at the reduced areas of mating strips like 860. Th pol fac of the upper yoke on the left is terraced into stair steps like 830, while armature 840 is terraced into complementary stair steps like 850, and similarly on the upper right and lower left and lower right. For large gaps, attraction forces differ little from those encountered for straight sloping poleface surfaces. On approach to magnetic closure of the top gap, as shown in FIG. 8b, the flux begins to concentrate into reduced mating areas, with a corresponding increase in magnetic attraction at constant net flux. Upon full closure, as shown in FIG. 8c, the flux crosses primarily across closed gaps like 860, while open areas like 870 between closed gaps carry little flux. The lines indicating lamination layers are omitted in FIG. 8c while lines like line 880 are drawn on the cross-section of 840 to indicate how flux from closed gaps can flow in non-overlapping bands of constant width from the left to the right mating poleface areas, while arrows like 890 indicate flux direction in each of the bends. A design goal whose realization is illustrated here is to avoid flux bottlenecks while utilizing a very large fraction of the available cross-section area, thus loading to a design with low moving armature mass. The thick middle region of the armature can lend high bending strength and stiffness to the entire armature. With the armature constructed from horizontal laminations, viewed edge-on and lying flat from left-to-right in FIGS. 8a, 8b, and 8c, magnetic flux travels primarily in the horizontal direction for which the laminations inhibit eddy currents. This construction leads to high strength in the armature. The yoke, which is inherently much stronger because of its size and with the possibility of external support structure (clamping bolts, etc.), is built up of laminations lying in the planes of FIGS. 8a, 8b, and 8c and stacked out of the plane of the drawings. Eddy current damping that would operate selectively on flux shift and not on net flux change would be difficult to achieve in a topology of this sort. Like the toothed configuration of FIGS. 6a, 6b, and 6c, the terraced configuration of FIGS. 8a, 8b, and 8c results in lateral flux shifts across short distances. No area extending very far in two different dimensions experiences a net change in flux due to flux shift. Significant eddy current damping, using the most conductive substances economically available (e.g., copper), in the relevant range of time constants (e.g., around 100 to 500 microseconds), cannot be achieved in such smell dimensions as the overlapping strips where flux conduction is illustrated in FIG. 8c.

Figure 9A:
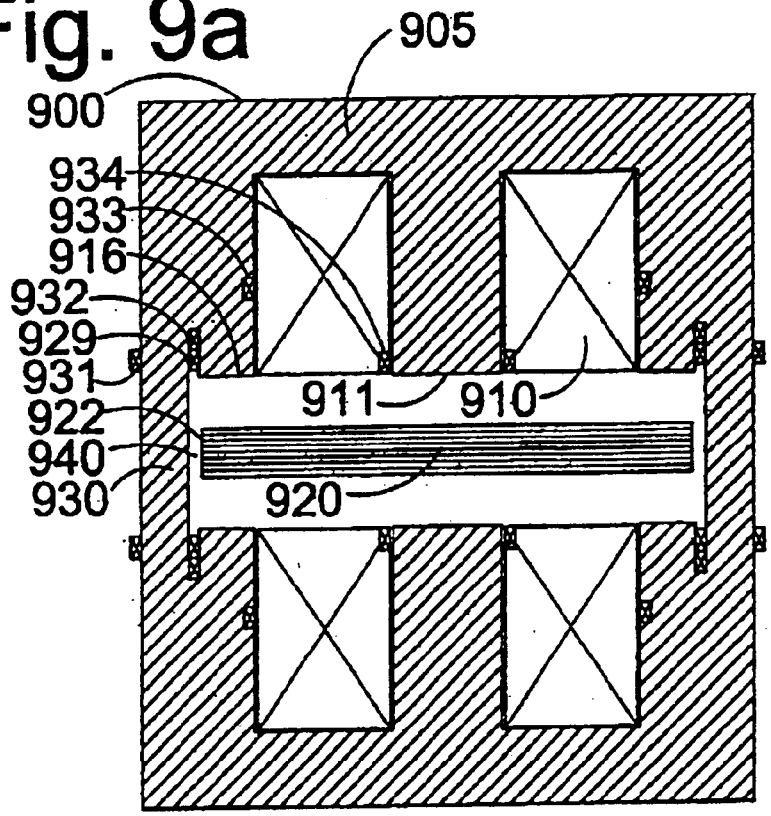
FIG. 9a illustrates variations on design principles shown in FIG. 5a and following, as adapted for an E-core topology, but omitting the poleface recess area and connecting the top and bottom E-cores along the sides, thereby providing lateral flux paths from the joined E-cores to the armature for enhancing pull at a distance.

The flux shift invention described so far in relation to U-core solenoid topologies can be carried over to E-core topologies, as illustrated in FIGS. 9a, 9b, 9c, and 9d. In FIG. 9a, the E-cores of assembly 900 above and below the armature are joined by bridge region 930 on the left and similarly on the right to form single yoke laminations 905. The upper E-core region includes a winding 910, a center tongue extending down to mating poleface surface 911, and side tongues extending down to mating poleface surfaces like 916 to the upper left of the armature, and similarly in the other three quadrants. The side bridge region 930 creates a horizontal gap 940 to the edge 922 of armature 920. Similar features are found symmetrically on the upper right, lower right, and lower left quadrants of the diagram. With 920 in the middle position as illustrated, most of the flux passing via 911 into the armature crosses lateral gap 940 on the left and similarly on the right. With 920 in the top latching position, the flux that was crossing 940 has shifted to a vertical path into poleface 916 on the left and similarly on the right. While flux across lateral gap 940 does not provide axial pull, flux via 916 does produce pull. Thus, the flux shift from 940 to 916 that takes place when 920 approaches its top position is accompanied by a large increase in axial force. If lateral gap 940 is kept small, then for a centrally located armature, most of the upper flux circuit reluctance is associated with poleface 911. The total reluctance is then substantially smaller than with a conventional E-I core combination where flux at the sides must cross a large vertical gap. Considering magnetic force per ampere turn within saturation limits, efficiency is significantly higher with narrow lateral side gaps than with wide vertical side gaps. While vertical magnetic pull at the sides is sacrificed, the reduction in total reluctance of the magnetic circuit far more than compensates by creating a large flux change and large forces via poleface 911. Associated with this higher efficiency situation is a lower force threshold at magnetic saturation of the armature, since the increased efficiency relies on larger amounts of magnetic flux per ampere-turn. At large magnetic gaps, however, the winding currents needed to approach saturation are practically unattainable, so operation at large gaps is generally not constrained by saturation limits. Moderate fluxes across large gaps produce small to medium magnetic forces to replenish lost armature energy and get the armature across the middle region in order to latch. When high fluxes and high forces are needed for latching, the solenoid of FIG. 9a behaves like a conventional E-I solenoid, with negligible flux traveling laterally across 940.

Figure 9B:
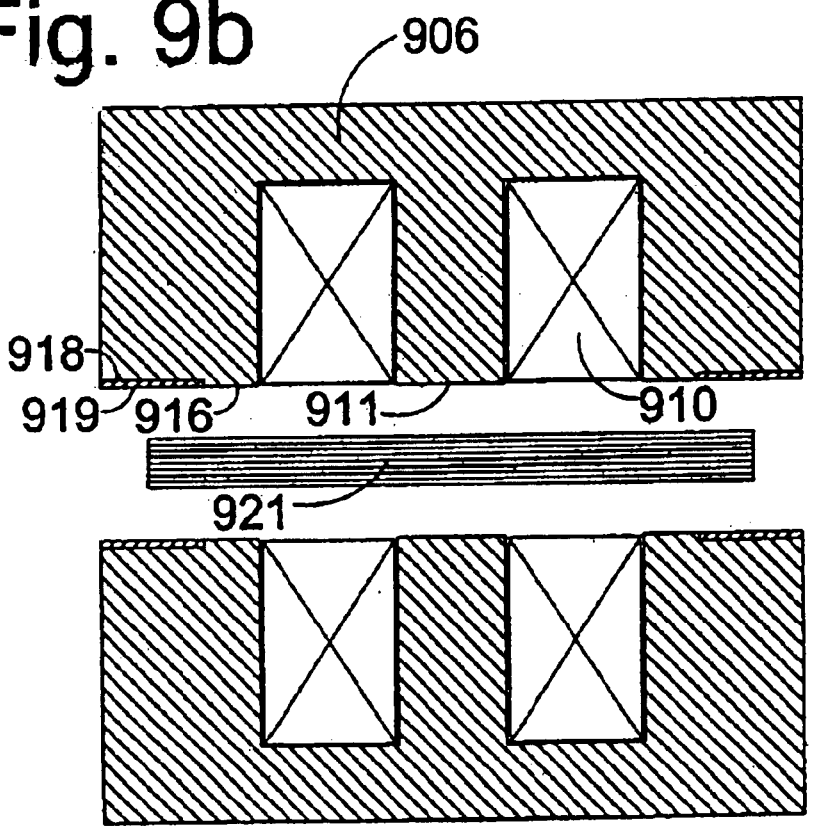
FIG. 9b is similar to FIG. 9a but omits the connection between top and bottom E-cores, uses a wider armature and considerably wider side legs of the E-core, and employs recessed areas for efficient pull at a distance and lateral flux transfer for latching.

FIG. 9b illustrates another variation on the flux shift theme. Here, armature 921 is made wider than 920, and yoke 906 is increased in width to an even greater extent than the armature. A recessed magnetic surface 918 extends to the left of original poleface 916, and similarly on the right, with a slab of conductive non-magnetic material 919 filling the gap left by the recess (and similarly on the right). 919 functions similarly to 527 of FIGS. 5a and 5b in providing an intentional eddy current path sensitive to flux shift and thereby providing damping of the force transition on latching and unlatching. The abrupt increase in axial force upon latching with constant total flux, due to lateral concentration of flux across 916 (and symmetrically on the right) from a larger area, is a theme made familiar by examination of FIGS. 5a and 5b. There could be a recessed area or areas associated with center post 911, but the high cost of center space has led, in this example embodiment, to the choice of keeping all recessed area on the sides.

FIGS. 9c and 9d illustrate yet another variation on the flux shift theme. Here, the end-section and side-section views of 9c and 9d, at 900 and 902, are taken through the middle of the solenoid and show the vertical shaft 950 cutting through the center. The laminations of the top yoke are indicated at 907. While the shaft would appear to eliminate most of the working area of the center tongues of the yokes in 9c, and the corresponding armature area, end elevation sections taken elsewhere in the depth of the solenoid would show uninterrupted central magnetic working space, as in FIGS. 9a and 9b. The region of extra recessed poleface area is shown in the side elevation section of 9d, where armature 922 is reduced in thickness at the ends, adding non-closing area used for pull at a distance and at relatively low flux densities into the outer portions of the armature. The yoke laminations of yoke 902, at the ends, extend slightly further down, both on the sides and in the center tongue, with the remaining non-closing poleface gap being filled by metal plates ouch so 959, repeating a theme described above in other contexts. This configuration concentrates the highest magnetic forces for latching in a central fraction of the armature length, thus reducing stresses and instabilities associated with generating high forces at large radii from shaft 950. As with other configurations, figure-8 windings can readily be introduced into this configuration to provide selective damping for flux shift while minimizing damping lose s associat d with pulling across large gaps. In the context of FIGS. 9c and 9d, the damping loops would respond with conduction to a flux shift from ends to middle or vice versa.

Revisiting the topology of FIG. 9a, a potential drawback is magnetic torsional instability, as illustrated in FIGS. 10a and 10b with plan view 1000. With a slight armature rotation about shaft 1010 (which was not shown in the section view chosen for FIG. 9), e.g., a counterclockwise rotation of one degree, the uniform magnetic gaps at 1031, 1032, 1033, and 1034 become narrow gaps 1041 and 1044 on the upper left and lower right and wide gaps at 1042 and 1043 on the upper right and lower left. Magnetic flux wilt concentrate across 1041 and 1044 and be reduced at 1042 and 1043, causing unbalanced lateral magnetic forces and torsion, reinforcing the alignment error. The torsional instability may be countered by rotational guidance, e.g., by flat bushing surfaces as indicated at 1031, 1032, 1033, and 1034. These bushings, on the insides of the bridge surfaces 930 and opposite 930, fill gaps like 940 at the corners of armature 920 and provide rotational guidance. Such bushings are but one of a number of remedies for magnetic torsional instability. As an alternative to mechanical guidance solutions, one can design an inherently stable magnetic structure and avoid extra mechanical components. Complications in lamination shape as illustrated in FIGS. 11a and 11b may be inexpensive to realize in a stamping, whereas a "simple" guidance means such as a bushing or flexing flat spring may be costlier and more prone to failure. Near the middle of the armature, the lateral gap is made circular about 1110, for example in circular interface areas 1160, with notches like 1170 in the yoke 1100 and like 1180 in the armature 1120 providing some torsional stabilization. As shown in FIG. 11b with a one degree counterclockwise armature rotation (as in FIG. 10b), the rotated notch s 1181 do not align with 1170 in the same way as un-rotated notches 1180, resulting in a slight increase in magnetic reluctance for the circular regions of FIG. 11b, as compared with the comparable regions of FIG. 11a. This increased reluctance implies a torsional stabilization, admittedly weak for the geometry illustrated. Moving toward the ends of the armature, lateral flux gaps cross circumferential gap regions like 1140. In the return regions of the sawtooth shape made with the circular gap regions centered on 1110, vertical magnetic gaps like 1150 are made much wider than the circumferential gaps like 1140. Flux conduction from yoke region 1130 to armature 1120 is thus dominated by conduction across circumferential gaps, which generate no torsional forces, while a much reduced fraction of the net lateral flux crosses the much wider gaps like 1150. Comparing FIG. 11b to 10b for example, the relative differences between narrow gaps 1141 and 1144 compared to wider gaps 1142 and 1143 are much smaller than the relative differences of gaps 1041 and 1044 compared to 1042 and 1043, for the same armature rotation in each case. Theme effects combine to provide a very substantial reduction in the destabilizing torsion going from un-rotated armature 1120 to rotated armature 1121, as compared to armatures 920 and 921. The torsional instability is substantially reduced, but probably not eliminated, for the shapes of FIGS. 11*a* and 11*b*. More drastic geometric modifications can lead to positive torsional stability, probably with some performance and manufacturing penalties due to flux bottlenecks and tight dimensional tolerances associated with a fully stable geometry. In a practical design, the relative degree of magnetic torsional stabilization will be traded off against mechanical design tradeoffs and performance tradeoffs.

In a geometry like that of FIGS. 11*a* and 11*b*, reluctance associated with lateral flux conduction is quite low due to the narrow circumferential gaps and considerable circumferential length in the sawtooth pattern. Thus, flux shift for latching can be accomplished from lateral flux directly to flux across mating outer poleface surfaces over a very short axial travel of the armature. As a construction detail, the bridge region between upper and lower E-cores, similar to 930, is made quite narrow in 1130, while the sculpted planform of 1131 is constructed with a stack of identically stamped laminations lying in the plane of the plan view diagram of FIGS. 11*a* and 11*b*, in the same plane as the armature laminations. The inserted stack of 1131, and similarly on the right, is joined to the inside surface of the bridge regions like 1130 for some degree of magnetic continuity.

Principles of flux shift damping described earlier can be applied to the geometry viewed in section in FIG. 9*a*, in plan view in FIG. 10*a*, and, with modification for torsional stability in the plan views of FIGS. 11*a* and 11*b*. In a simple and effective winding topology, small winding cross-sections 932 and 933 represent the two sides of a simple shorted loop winding, which could be a single turn of heavy rectangular conductor or multiple turns of smaller wire. A comparable winding is found symmetrically on the right of assembly 900. 933 and its counterpart on the right are higher than 931 and its counterpart, rather than coming back in a flat plane, in order to avoid creating bottlenecks for flux going down to the outer axial-facing polefaces at 916 and opposite. These damping windings have little effect when most of the net flux travels via the shunt path through 930, across lateral gap 940, and into surface 922, and similarly on the right. On approach to magnetic closure, however, the abrupt flux shift to surface 916 and similarly on the right induces a current in the windings of 932 and 933, and similarly on the right. The configuration of FIG. 9*a* thus does not require a figure-8 winding to give a response fairly selective to the flux shift event and fairly insensitive to net flux change at large magnetic gaps. To control the response more precisely, it is possible to add reverse turns (generally a fraction of the turns count of winding 932–933 and opposite) in the winding cross-section areas indicated at 929 and 931 and similarly on the right, thus obtaining a controlled degree of "figure-8" characteristics and generating a null response to drive winding flux for a chosen axial position of the armature. The same null can be accomplished by using a winding coaxial with the drive winding, as indicated at 934 and symmetrically on the right, connecting this winding and the 932–933 winding and the winding symmetrically on the right of 932–933 all in series connection, paying attention to the relative rotation senses of the windings and to the ratio of turns in the different windings.

By controlling the winding ratios and winding rotation senses among the damping windings just described, one can null the coupling between the drive flux circuit and the flux shift circuit for a chosen armature position, e.g., somewhere in the flux-shift region close to closure of the polefaces. One might choose something other than a null in the flux shift region. When an abrupt flux shift associated with latching or unlatching of the armature induces a transient current in the flux shift windings, this transient can be coupled inductively to the drive winding 910 in the polarity and to the degree desired. This cross coupling can be used for a transfer of actuation energy and information. For energy transfer, the cross coupling can cause a drive winding voltage to move a combination of net flux and a lateral flux shift, e.g., for a reinforcing effect on total magnetic attraction force. If this cross coupling is made, then an abrupt lateral flux shift will induce an abrupt change in the current through the drive winding, which can be detected by the circuitry that actuates the drive winding. Hence, the control circuitry can obtain high resolution information indicative of the mechanical landing and release processes.

With minor conceptual modification, the geometry of FIG. 9*a* becomes the geometry of a solenoid with cylindrical symmetry and a central shaft, as shown in FIG. 12. The proportions change, e.g., such that the area of the center pole of the circular yoke matches the perimeter area where the armature contacts the axially-facing yoke surface, meaning that the differences in the squares of radius match in the drawing, rather than the linear differences in lateral distance. As seen, shaft 1202 through yoke 1205 supports armature 1220, which consists of disk-shaped laminations. Upper winding 1210 is labeled on the right and cuts the plane of the diagram symmetrically on the left, as does a similar winding below. The center top poleface area is 1211, labeled on the left, while the corresponding outer axial-facing top poleface 1216 is labeled on the right, while similar features are found facing up from the bottom on the opposite side of the armature. Radial magnetic gap 1240 carries flux from bridge region 1230 to the outer cylindrical surface 1222 of the armature. Flux shift damping windings are not shown in FIG. 12. The radial symmetry of the solenoid of FIG. 12 eliminates the rotational instability problem that led to the complicated lateral interface shape of FIGS. 11*a* and 11*b*. The comparative simplicity advantage of this radially symmetric design is offset, in some design contexts, by the need to achieve a longer and much narrower profile for fitting solenoids side-by-side with tight spacing, e.g., for internal combustion engine valves. Another disadvantage is that too much moving mass is used in the outer parts of the armature, where large radii lead to more cross-section than is needed to carry magnetic flux. The excess mass problem can be remedied by judicious removal of unneeded magnetic material, e.g. by cutting wedge-shaped slots in from the outer surfaces of internal armature laminations, in a radial counterpart of the lamination cutting pattern of FIG. 6*a*. This provides one of many possible examples of application of the flux shift invention to solenoids with radial symmetry, often called pot core solenoids.

To review the invention, one can employ the principles of lateral flux shift, and of inductive damping of lateral flux shift, to control the force and efficiency and damping characteristics of a solenoid. One can use large effective areas of electromagnetic attraction to increase pulling efficiency of a solenoid across a large axial gap. One can similarly use flux conduction across narrow lateral gaps to increase pulling efficiency across a large axial gap. One can cause a transition to a smaller effective attraction area as the axial gap becomes small, thus increasing force at constant flux and force at saturation flux for small gaps. One can similarly cause a transition of flux from a lateral gap to an axial gap, increasing axial force at constant flux and at saturation flux. In some configurations, one can damp the lateral flux shift associated with this transition in effective area, thus damping the mechanical motion in the vicinity of latching. The depth of the close-range flux-shift transition zone can be controlled by values and ratios among mating poleface areas, recessed poleface areas, recess depths, and the areas and gaps that might be used for lateral couplings of magnetic flux. The same kinds of design adjustments can vary, as a function of gap, the tradeoff between the ampere-turn efficiency at altering magnetic force and the (approximately) inversely related capability for developing a maximum force at saturation. Since saturation at large magnetic gaps is almost unachievable in a practical system, it is advantageous to favor high force-per-ampere-turn efficiency at large gaps, while designing for a transition to the highest achievable force at saturation in the latching condition. All these degrees of control of magnetic characteristics are made possible through variations on a theme of lateral redistribution of magnetic flux as a function of poleface gap.

From among the numerous topologies, shapes, and winding configurations described above, implying numerous significantly different embodiments of the invention, an embodiment preferred for high performance is characterized as follows. It includes the dual-latching solenoid of E-cores joined by side bridges like 930, as described in relation to FIGS. 9a and 10a. Guidance bushings like 1031 through 1034 prevent the rotation shown in FIG. 10b. The solenoid includes simple (non-figure-8) upper and lower flux shift damping windings like 932–933, which are effective almost exclusively during the flux shift very close to latching. Keeping extra armature area and mass to a minimum, the design includes no recessed poleface area, relying entirely on flux shift between lateral flux across side gaps and axial flux between polefaces that close to full contact. Since lateral flux produces no axial force, this configuration causes nearly all the attractive force associated with the outer portions of the armature and the outer legs of the E-cores to be nullified when the flux shifts from axial to lateral paths. By concentrating flux across closing axial gaps up to the saturation limit in both the middle and side regions of the armature, approximately half the latching force is associated with the side regions of the armature, making that half of the force subject to flux shift. For pulling at a distance, the low reluctance of the lateral flux paths results in a substantial increase in net flux change per ampere turn, yielding nearly a doubling in efficiency for pulling at a distance, as compared to an E-core topology without the lateral flux paths.

While the configuration described in relation to FIGS. 9a and 10a potentially offers the highest overall performance, an embodiment that may be preferred for economy, simplicity, and robustness is that of FIGS. 6a, 6b, and 6c. The armature in this embodiment is much thicker, giving it much more bending strength and stiffness, yet the mass is held down by removal of internal material. The armature is torsionally stable and therefore does not require linear bushing alignment. A particularly large effective magnetic attraction area with relatively low flux leakage (compared to an E-core topology) lends efficiency for pulling across a large gap, while a large effective area reduction upon latching aids in prompt landing and release. While the specific proportions of FIGS. 6a, 6b, and 6c give limited potential for flux shift damping by eddy currents, altered proportions could yield better damping possibilities.

The other figures and associated discussion in this specification indicate variations possible within the scope of the present invention. One skilled in the art will readily identify flux shift methods to improve performance of other magnetic topologies, e.g., pot cores with truncated sides (cut off in order to fit a narrow dimension). This disclosure has shown various ways to increase pull across a large gap for a given number of ampere turns; to provide an abrupt increase in axial force at constant flux upon latching, with a corresponding abrupt decrease in axial force upon release; to provide induced-current damping that is selective for the lateral flux shift associated with the force change upon latching and release, while those induced currents do not strongly interact with or impede changes in overall flux controlled by changes in solenoid winding current; to provide controllable modification of that induced-current damping through passive or active electronic means; to reduce or reverse the torsional instabilities associated with a dual joined E-core topology with lateral flux conduction to the armature; and to provide controllable variable drive-circuit force couplings that differ for small-gap and large-gap interactions. It has been shown in a larger control context that the passive electromagnetic design changes taught above lead to improvements in overall designs, including drive circuitry and control logic, to achieve efficient replenishment of lost kinetic energy and to achieve controlled, quick soft landing, with the needed large peak value of the third derivative of axial armature motion. This large third derivative marks a rapid increase in magnetic force from a moderate force allowing for rapid spring-motivated deceleration of the armature, to a larger holding force sufficient to maintain latching. The range of application of the principles taught by the present invention will be better understood in relation to the following claims.

What is claimed is:

1. A dual-latching solenoid comprising a first ferromagnetic U-core yoke, a second ferromagnetic U-core yoke, and a ferromagnetic armature positioned to travel between said first yoke and said second yoke and arranged to be latched magnetically to either said first yoke or said second yoke, said armature having a center region and a non-center region adjacent to said center region and having a boundary therebetween and further including pathways that conduct induced current selectively in response to flux redistribution between said center region and said non-center region of said armature, wherein:

a. a surface of said first yoke includes one or more steps separating approximately axially facing poleface regions of said first yoke, wherein one or more of said poleface regions is configured to mate with said armature when said armature is latched to said first yoke;

b. said center region of said armature is thicker than said non-center region, wherein one of said one or more steps of said first yoke is near to and substantially parallel to said boundary of said armature when said armature is latched to said first yoke; and c when said armature is latched to said first yoke, said center region of said armature is in mating communication with one or more of said poleface regions of said first yoke while a gap remains between at least a portion of said non-center region and said first yoke.

2. The solenoid of claim 1, wherein when said armature is latched to said first yoke, said center region and said non-center region of said armature are in mating communication with one or more of said poleface regions, and wherein a gap is established between one or more of said steps of said first yoke and a region of said armature beyond said non-center region thereof.

3. The solenoid of claim 1, wherein said first and second yokes are symmetric mirror images and said armature has surfaces facing said first and second yokes that are symmetric mirror images about a central plane through said armature.

4. The solenoid of claim 1, wherein said first and second yokes are asymmetric and said armature has surfaces facing said first and second yokes that are asymmetric with respect to a plane perpendicular to an axial direction of said traveling between said yokes.

5. The solenoid of claim 1, wherein said pathways cause velocity damping in the axial magnetic force on said armature when said armature is close to either of said yokes.

6. A solenoid including an armature, a yoke, a drive winding, and a variable gap between said armature and said yoke, said yoke including:
   a. a facing poleface area across said variable gap, said facing area including regions of north magnetic polarity and south magnetic polarity during operation of said solenoid;
   b. a side area, bounding said regions of said facing poleface area;
   c. a mating poleface area, constituting a fraction below 90% of said facing poleface area;
   d. a non-mating poleface area, constituting 100% minus said fraction below 90% of said facing poleface area and having a ferromagnetic material recessed thereover, wherein the effective average magnetic gap across said non-mating poleface area exceeds the effective average magnetic gap across said mating area by at least a factor of 2 during a latching portion of the operation of said solenoid; and
   e. non-ferromagnetic electrically conductive material disposed between said mating poleface area and said non-mating poleface area to cause a controlled damning of motion of said armature.

7. The system of claim 6, wherein said non-mating poleface area includes a plurality of non-contiguous areas.

8. The system of claim 6, wherein said non-mating poleface area includes a plurality of slots.

9. The system of claim 6, wherein said conductive material fills where said ferromagnetic area is recessed over said non-mating area.

10. The system of claim 6, wherein said conductive material forms a closed conductive path, said path including a first loop and a second loop of a figure-8 topology, said first loop having an opposite current rotation sense compared to said second loop, wherein said first loop encloses part of said mating poleface area while said second loop encloses part of said non-mating poleface area, and wherein said part of said mating area and said part of said non-mating area have matching magnetic polarity.

11. The system of claim 10, wherein said conductive path further includes one or more supplemental loops in addition to said first loop and said second loop, wherein said one or more supplemental loops enclose part of said facing poleface area having the same magnetic polarity as said matching magnetic polarity of said first loop and said second loop.

12. The system of claim 10, wherein said conductive path further includes one or more supplemental loops in addition to said first loop and said second loop, wherein said one or more supplemental loops enclose part of said facing poleface area having the opposite magnetic polarity from said matching magnetic polarity of said first loop and said second loop.

13. The system of claim 10, further comprising an impedance element modifying current flow in said conductive path.

14. The system of claim 6, wherein said solenoid includes a second yoke in addition to said yoke, said solenoid having a second latching portion of operation in addition to the latching portion associated with the first yoke, wherein said armature latches to said second yoke during said second latching portion.

15. The system of claim 14, wherein said second yoke includes a second non-mating poleface area in addition to said non-mating poleface area of said first yoke.

16. The system of claim 6, further comprising a side gap area between said armature and said yoke, wherein:
   a. a substantial fraction of magnetic flux in said armature flows across said side gap area rather than to said poleface area when said variable gap is at a maximum variable gap value; and
   b. said substantial fraction is greatly reduced during latching of said latching portion of said operation.

17. The system of claim 6, with said armature having reduced armature mass at high armature stiffness, said armature being constructed from surface laminations in combination with internal laminations, said laminations lying in a plane perpendicular to the axis of motion of said armature, wherein said internal laminations have less area than surface laminations.

* * * * *